(12) United States Patent
Matyjaszewski et al.

(10) Patent No.: US 8,962,764 B2
(45) Date of Patent: Feb. 24, 2015

(54) PREPARATION OF FUNCTIONAL STAR MACROMOLECULES

(75) Inventors: Krzysztof Matyjaszewski, Pittsburgh, PA (US); Haifeng Gao, Albany, CA (US); James Spanswick, Wheaton, IL (US)

(73) Assignee: Carnegie Mellon University, Pittsburgh, PA (US)

( * ) Notice: Subject to any disclaimer, the term of this patent is extended or adjusted under 35 U.S.C. 154(b) by 24 days.

(21) Appl. No.: 13/260,504

(22) PCT Filed: Mar. 29, 2010

(86) PCT No.: PCT/US2010/029073
§ 371 (c)(1),
(2), (4) Date: Dec. 16, 2011

(87) PCT Pub. No.: WO2010/111708
PCT Pub. Date: Sep. 30, 2010

(65) Prior Publication Data
US 2012/0077899 A1 Mar. 29, 2012

Related U.S. Application Data

(60) Provisional application No. 61/211,180, filed on Mar. 27, 2009.

(51) Int. Cl.
C08F 290/02 (2006.01)
C08F 293/00 (2006.01)
C08F 8/00 (2006.01)
C08J 3/28 (2006.01)

(52) U.S. Cl.
CPC .......... C08F 290/02 (2013.01); C08F 293/00 (2013.01)
USPC ................ 525/308; 526/72; 526/78; 526/79; 526/86; 526/89; 526/347

(58) Field of Classification Search
USPC ................ 526/72, 78, 79, 86, 89, 347, 308; 525/308
See application file for complete search history.

(56) References Cited

U.S. PATENT DOCUMENTS

| | | | |
|---|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,546,083 A | 12/1970 | Ort et al. |
| 3,573,180 A | 3/1971 | Hodes et al. |
| 3,862,978 A | 1/1975 | Decker et al. |
| 3,953,305 A | 4/1976 | Connolly |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,362,813 A | 11/1994 | Antonelli et al. |
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |

(Continued)

FOREIGN PATENT DOCUMENTS

CA 2209061 2/1998
EP 0265091 A1 4/1988

(Continued)

OTHER PUBLICATIONS

Buback et al. (1995) Macromol. Chem. Phys. 196, 3267-80.
Buback et al. (2002) Macromol. Chem. Phys. 203, 2570-2582.
Furukawa, T. and K. Ishizu, *Journal of Colloid and Interface Science*, 253(2), 465-469, (2002).
Gao, H. and K. Matyjaszewski, "Low Polydispersity Star Polymers with Core Functionality by Cross-linking Macromonomers Using Functional ATRP Intiators," *Macromolecules*, 40, 399-401 (2007).
Gao et al., *J. Am. Chem. Soc.*, Low Polydispersity Star Polymers via Cross-linking Macromonomers by ATRP, 128, 15111-15113 (2006).
Kamigaito et al., *Chem. Rev.*, 101, 3689 (2001).
Kanaoka et a., "Synthesis of star-shaped poly-vinyl ethers by living cationic polymerization: pathway for formation of star-shaped polymers via polymer linking reactions," *Polymer Bulletin (Berlin)* 44(5-6): 485-492, (2006).
Matyjaszewski et al., "Atom Transfer Radical Polymerization," *Chemical Reviews*, 2001, pp. 2921-2990, vol. 101(9).
Haddleton et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).

(Continued)

*Primary Examiner* — Jeffrey Mullis
(74) *Attorney, Agent, or Firm* — K&L Gates LLP

(57) ABSTRACT

A process for constructing multi-arm star macromolecules with uniform properties, high molecular weight and narrow molecular weight distribution using free radical polymerization is described.

35 Claims, 8 Drawing Sheets

(56) References Cited

U.S. PATENT DOCUMENTS

| | | |
|---|---|---|
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,031,017 A | 2/2000 | Waki et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,598,721 B2 | 7/2003 | Schmidl |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,828,025 B2 | 12/2004 | Ali et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson et al. |
| 7,049,373 B2 | 5/2006 | Matyjaszewski et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,332,550 B2 | 2/2008 | Matyjaszewski et al. |
| 7,407,995 B2 | 8/2008 | Ok |
| 7,825,199 B1 | 11/2010 | Matyjaszewski et al. |
| 2002/0026005 A1 | 2/2002 | Munro |
| 2003/0065389 A1 | 4/2003 | Petersen |
| 2003/0216528 A1 | 11/2003 | Matyjaszewski et al. |
| 2003/0236371 A1 | 12/2003 | Wilson et al. |
| 2004/0044152 A1 | 3/2004 | Matyjaszewski et al. |
| 2004/0171779 A1 | 9/2004 | Matyjaszewski et al. |
| 2004/0204556 A1 | 10/2004 | Matyjaszewski et al. |
| 2004/0253443 A1 | 12/2004 | Anselmann et al. |
| 2005/0090632 A1 | 4/2005 | Matyjaszewski et al. |
| 2006/0008490 A1 | 1/2006 | Russell et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2007/0276101 A1 | 11/2007 | Matyjaszewski et al. |
| 2008/0114128 A1* | 5/2008 | Destarac et al. .............. 525/193 |

FOREIGN PATENT DOCUMENTS

| | | |
|---|---|---|
| EP | 0341012 A2 | 11/1989 |
| EP | 0434438 A | 6/1991 |
| EP | 0457916 A | 11/1991 |
| EP | 0789036 | 8/1997 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 1386935 A | 2/2004 |
| JP | 6322171 A | 11/1994 |
| WO | WO 88/00603 A3 | 1/1988 |
| WO | WO 94/13706 A | 6/1994 |
| WO | WO 97/18247 | 5/1997 |
| WO | WO 98/01480 | 1/1998 |
| WO | WO 98/06758 A1 | 2/1998 |
| WO | WO 98/20050 A2 | 5/1998 |
| WO | WO 99/28352 A | 6/1999 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 02/081372 A2 | 10/2002 |
| WO | WO 03/097107 A | 11/2003 |
| WO | WO 2004/041972 A | 5/2004 |
| WO | WO 2004/060928 A | 7/2004 |
| WO | WO 2004/087777 A2 | 10/2004 |
| WO | WO 2005/056621 | 6/2005 |
| WO | WO 2005/087819 A1 | 9/2005 |
| WO | WO 2007/025086 A2 | 3/2007 |
| WO | WO 2007/025310 A1 | 3/2007 |
| WO | WO 2007/075817 A1 | 7/2007 |
| WO | WO 2008/009997 A1 | 7/2007 |
| WO | WO 2008/057163 A2 | 5/2008 |
| WO | WO 2008/148000 A1 | 12/2008 |
| WO | WO 2009/023353 A9 | 2/2009 |

OTHER PUBLICATIONS

Min et al., "Preparation of homopolymers and block copolymers in miniemulsion by ATRP using Activators Generated by Electron Transfer (AGET)," *Journal of the American Chemical Society* 127, 3825-3830 (2005).

Odian, Principles of Polymerization, Third Edition, John Wiley & Sons, p. 205-233 (1991).

Ohno, S. and K. Matyjaszewski, "Controlling Grafting Density and Side Chain Length in Poly(n-butyl acrylate) by ATRP (Co)polymerization of Macromonomers," *Journal of Polymer Chem. Ed.*, 2006, 44, 5454-5467 (2006).

Pakula et al., "Polymers, Particles, and Surfaces with Hairy Coatings: Synthesis, Structure, Dynamics, and Resulting Properties," in ACS Symposium Series, Advances in Controlled/living Radical Polymerizations, American Chemical Society Division of Polymer Chemistry, 2003, Chapter 26, pp. 366-382, vol. 854.

Zilliox et al., "Preparation of star-shaped macromolecules by anionic copolymerization," Journal of Polymer Science, Polymer Symposia, No. 22 (Pt. 1): 145-56, (1968).

Shibata, et al., "Quantitative Synthesis of Star-Shaped Poly(vinyl ether)s with a Narrow Molecular Weight Disribution by Living Cationic Polymerization," *Journal of the American Chemical Society*, 128(23): 7497-7504, (2006).

Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).

* cited by examiner

Scheme 1

Scheme 2

1. Functional initiator — α end modification

2. Halogen chain-end modification — ω end modification

Scheme 3

Scheme 4

Scheme 5

PREPARATION OF FUNCTIONAL STAR MACROMOLECULES

CROSS REFERENCE TO RELATED APPLICATIONS

This application is a nationalization of PCT International Application No. PCT/US2010/029073, having an international filing date of Mar. 29, 2010, which claims the priority benefit of U.S. Provisional Application Ser. No. 61/211,180 filed Mar. 27, 2009, the disclosures of each of which are incorporated herein by this reference.

TECHNICAL FIELD OF THE INVENTION

A new strategy to construct functional responsive multi-arm star macromolecules with uniform properties, high molecular weight and narrow molecular weight distribution using standard free radical polymerization techniques is described.

BACKGROUND OF THE INVENTION

Star polymers are nano-scale materials with a globular shape, multiple segmented arms and a high-density of peripheral functionality. The spherical shape and dense structure of this type of polymer are expected to provide a suite of properties and functions different from that of linear polymers. Indeed the preparation of functionalized star polymers with uniformed size and multiple arms/functionalities is presently the subject of extensive academic and industrial interest due to their unique structure and potential applications in drug delivery systems, coatings, membranes and lithography.

Synthesis of star polymers is most often accomplished by "living" polymerization techniques via one of three strategies:
1) "core-first" which is accomplished by growing arms from a multifunctional initiator;
2) the "arm-first" method which involves cross-linking preformed linear arm precursors using a divinyl compound, or
3) "coupling-onto" involving attaching preformed arms onto a multifunctional core.

The "core-first" method is exemplified by the use of a multifunctional initiator in a living polymerization process, [U.S. Pat. Nos. 5,763,548 and 6,627,314], most often employing living ionic polymerization systems. This approach is also called the "grafting from" approach where the arms of the star are grown from a preformed functionalized core molecule or particle. As noted above the "arm-first" strategy can be sub-categorized according to the procedure employed for star formation. One method is chain extension of a linear arm precursor with a multivinyl cross-linking agent, and the other is coupling linear polymer chains to a multifunctional linking agent, or "grafting-onto" a multifunctional core with complementary functionality.

The development of living/controlled radical polymerization has revitalized the field of star polymer synthesis, especially for functional star polymers. Various star polymers with many arms have been synthesized, mostly using these two "arm-first" methods. [U.S. Pat. Nos. 6,512,060 and 6,627,314] However while the reaction of linking living linear polymers, or macroinitiators (MIs), by extending the linear polymer chain through incorporation of divinyl monomer units is a ready and effective means of preparing star polymers with many arms, the number of arms in the star macromolecule prepared by macroinitiator arm-first approaches have a statistical distribution of arms in each star, and additionally undergo star-star coupling reactions throughout the reaction affording star polymers with a broad molecular weight distribution (MWD). The incomplete consumption of linear polymers and the less-controlled star structure forces one to conduct an expensive fractionation step in order to obtain a star polymer with a narrow MWD.

Indeed the "arm-first" approach to star synthesis has been the subject of all living polymerizations systems. Anionic polymerization was described by Rempp [Zilliox, J. G., P. Rempp, et al. (1968). "Preparation of star-shaped macromolecules by anionic copolymerization." *Journal of Polymer Science, Polymer Symposia* No. 22 (Pt. 1): 145-56], and cationic has been summarized by Kanaoka. [Kanaoka, S., N. Hayase, et al. (2000). "Synthesis of star-shaped poly(vinyl ether)s by living cationic polymerization: pathway for formation of star-shaped polymers via polymer linking reactions." *Polymer Bulletin* (Berlin) 44(5-6): 485-492; Shibata, T., S. Kanaoka, et al. (2006). "Quantitative Synthesis of Star-Shaped Poly (vinyl ether)s with a Narrow Molecular Weight Distribution by Living Cationic Polymerization." *Journal of the American Chemical Society* 128(23): 7497-7504]

Recently controlled/living radical polymerization processes (CRP) have been developed. Atom Transfer Radical Polymerization (ATRP), nitroxide mediated polymerization (NMP), reversible addition fragmentation chain transfer (RAFT) and catalytic chain transfer (CCT) are examples of CRP processes that provide a relatively new and versatile methods for the synthesis of polymers with controlled molecular weight, low polydispersity and site specific functionality. Indeed, since CRP processes provide compositionally homogeneous well-defined polymers (with predicted molecular weight, narrow molecular weight distribution, and high degree of $\alpha$- and $\omega$-end-functionalization) they have been the subject of much study as reported in several review articles. [Matyjaszewski, K., Ed. Controlled Radical Polymerization; ACS: Washington, D.C., 1998; ACS Symposium Series 685. Matyjaszewski, K., Ed.; Controlled/Living Radical Polymerization. Progress in ATRP, NMP, and RAFT; ACS: Washington, D.C., 2000; ACS Symposium Series 768; Matyjaszewski, K., Davis, T. P., Eds. Handbook of Radical Polymerization; Wiley: Hoboken, 2002; Qiu, J.; Charleux, B.; Matyjaszewski, K. *Prog. Polym. Sci.* 2001, 26, 2083; Davis, K. A.; Matyjaszewski, K. *Adv. Polym. Sci.* 2002, 159, 1.] Therefore controlled radical polymerization procedures have been applied to star synthesis; e.g. by Zhang. [Zhang, L. and Y. Chen (2006). "Allyl functionalized telechelic linear polymer and star polymer via RAFT polymerization." *Polymer* 47(15): 5259-5266.] All of these procedures employed the reaction of "living" polymers, or macroinitiators with a difunctional monomer.

While CRP procedures have been employed to prepare many novel copolymers a need still exists for a robust, inexpensive process for the preparation of functional star macromolecules with control over all aspects of the synthesis of multi-arm star macromolecules.

Recently, a new strategy for the high-yield synthesis of low-polydispersity star polymers was reported. This was accomplished via copolymerization of a linear macromonomer (MM) and divinyl cross-linker using a low molar mass ATRP initiator in a homogeneous solution. [Wang, J.-S.; Matyjaszewski, K. *J. Am. Chem. Soc.* 1995, 117, 5614; Matyjaszewski, K.; Xia, J. H. *Chem. Rev.* 2001, 101, 2921; Kamigaito, M.; Ando, T.; Sawamoto, M. *Chem. Rev.* 2001, 101, 3689] The procedure was called the MM method. [Gao, H.; Ohno, S.; Matyjaszewski, K. *J. Am. Chem. Soc.* 2006, 128, 15111; Gao, H.; Matyjaszewski, K. *Macromolecules* 2007, 40, 399] In this method, the incorporation of arms into a star depends on the copolymerization of a linear MM with a crosslinker, which completely bypasses the requirements associated with chain extension of linear MI's, the MI method. However this procedure requires the presence of a catalyst complex that has to be removed from the solution of the final star macromolecule prior to use in many applications.

On the other hand, conventional free radical polymerization (FRP) possesses a number of advantages compared to any other chain-growth polymerization techniques, including easily attainable experimental conditions that are applicable to a broad range of monomer species. The products of a FRP do not possess any undesired functional groups such as halides present in many ATRP materials or sulfur containing degenerative transfer agents present in RAFT systems. However, FRP has intrinsic limitations, such as, slow initiation due to slow degradation of an added free radical initiator resulting in continuous generation of new chains and inevitable termination of all radicals during the polymerization, which has excluded the possibility of using the multifunctional initiator method and/or cross-linking of preformed macroinitiators (MIs) method for synthesis of well defined star polymers by FRP.

Furukawa and Ishizu reported the first approach to overcome these limitations associated with synthesis of star-like polymers by FRP of a polyisoprene MM and divinylbenzene (DVB). [Furukawa, T. and Ishizu, K (2002). *Journal of Colloid and Interface Science*, 253(2), 465-469] The solvent for the copolymerization was selected to induce micellization of the linear MM's, and solubilize the thermal initiator and DVB in the core of the micelle surrounded by the polyisoprene arms. Subsequent in-situ FRP occurred within each isolated core thereby stabilizing the micelle structure and producing core cross-linked star polymers. Therefore the process required pre-formation of micelles that were the precursor of the stars and there was no control over the polymerization process that occurred within the micelles and functional star core macromolecules were not prepared. Indeed due to the low efficiency of micellization, the star yield was low (<40%) and most of the linear MMs were not incorporated into star copolymers after polymerization. As described herein, the process of the present disclosure does not require micellization and allows incorporation of a much higher fraction of the added linear macromonomers, greater than 50%, preferable greater than 75% and optimally greater than 85%.

Another approach was disclosed by Antonelli, et al. in U.S. Pat. No. 5,362,813 when they conducted a free radical copolymerization of macromonomers prepared by cobalt mediated catalytic chain transfer polymerization with a diacrylate. This can be considered a crosslinking reaction involving a polyacrylate macromonomer possessing an α,α-disubstituted olefin, wherein one of the substituents is a carboxylic ester, and while star yield was not reported the polydispersity of the formed stars varied between 2.63 and 8.0, showing poor control over the star formation reaction.

We disclose a process that overcomes these limitations. The invention is not limited to the specific compositions, components or process steps disclosed herein to exemplify the concept as such may vary.

The term "multi-arm star" indicates that a star shaped macromolecule with three or more arms linked at the core of the star is formed.

The term "mikto-arm star" indicates that one or more of the arms in the multi-arm star macromolecule has a different composition than other arms attached to the same star core.

It is also to be understood that the terminology used herein is only for the purpose of describing the particular embodiments and is not intended to be limiting.

The procedure for preparation of star copolymers is exemplified by (co)polymerization of linear macromolecules, including macromonomers (MMs) with a divinyl crosslinker.

In one embodiment of the invention the MM used in this reaction can further comprise a reactive or a responsive functionality.

In another embodiment the added free radical initiator comprise a second functionality that is thereby incorporated into the core of the star macromolecule.

BRIEF DESCRIPTION OF THE FIGURES

The following figures assist in clarifying certain embodiments of the invention but are not intended to limit the invention to the examples described in the figures since other monomers and other ratio's of reagents can be employed in the star forming reaction.

Experimental conditions: [polyBA MM]$_0$/[AIBN]$_0$/[DVB]$_0$=1/0.2/3; [polyBA MM]$_0$=0.06 M; in anisole at 80° C. Linear polySt standards were used for calibration of the THF GPC.

Figure 2:
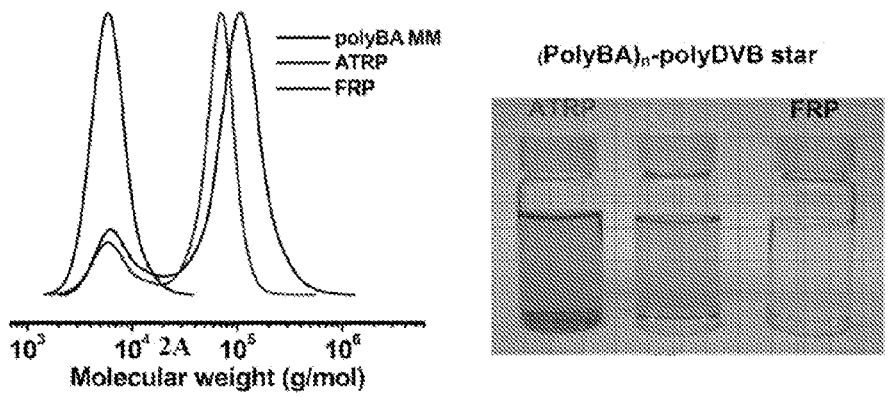

FIG. 2. Comparison of GPC curves of (polyBA)$_n$ and (polyBA)$_n$-polySt and (polyBA)$_n$-polyDVB synthesized by FRP method. (A) GPC of (polyBA)$_n$-polyDVB star polymers synthesized by ATRP and RP of polyBA MM and DVB; in ATRP: [polyBA MM]$_0$/[DVB]$_0$/[R–Br]$_0$=1/3/0.2; in FRP [polyBA MM]$_0$/[DVB]$_0$/[AIBN]$_0$=1/3/0.2, in anisole at 80° C., linear polySt standards were used for calibration of the THF GPC with RI detector; (B) images of star product synthesized by ATRP and FRP in THF.

Figure 3:
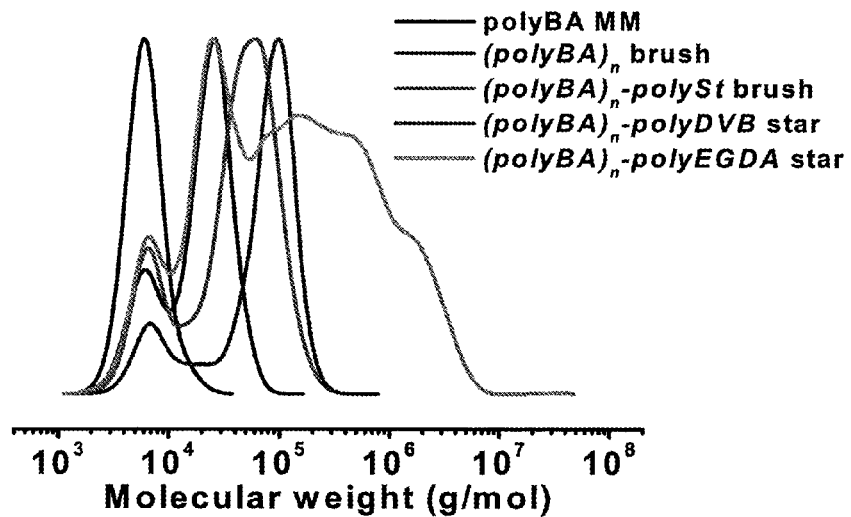

FIG. 3. Comparison of GPC curves of (polyBA)$_n$ and (polyBA)$_n$-polySt and (polyBA)$_n$-polyDVB synthesized by FRP method illustrating the effect of [AIBN]$_0$/[MM]$_0$ ratio on the structures of (polyBA)$_n$-polyDVB star polymers synthesized by FRP. Experimental conditions: [polyBA$_{42}$]$_0$/[DVB]$_0$/[AIBN]$_0$=1.0/3.0/I; [polyBA$_{42}$]$_0$=0.06 M; in anisole at 80° C.; linear polystyrene standards were used for calibration of the THF GPC.

Figure 4:
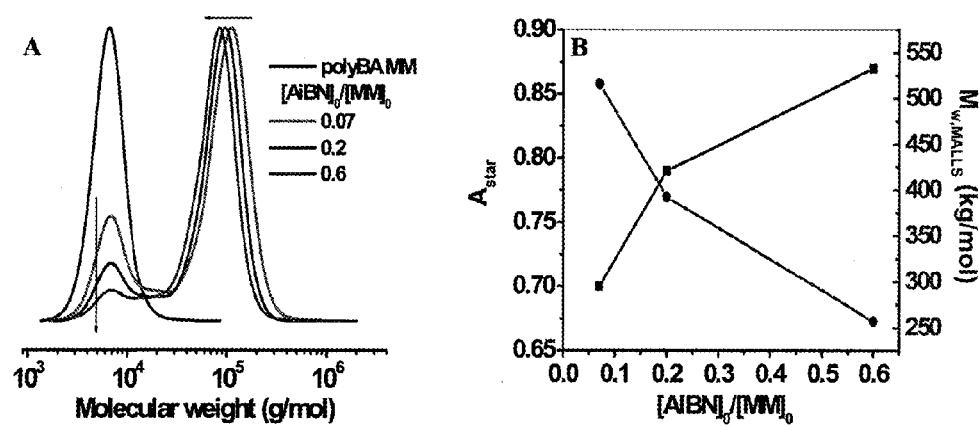

FIG. 4. GPC traces illustrating the effect of [AIBN]$_0$/[MM]$_0$ ratio on the structures of (PEO)$_n$-polyDVB star polymers prepared by macromonomer strategy using FRP method;

Experimental conditions: [PEO MM (DP 45)]$_0$/[DVB]$_0$/[AIBN]$_0$=1.0/3.0/0.2; [PEO MM]$_0$=0.06 M, linear polyMMA standards for DMF GPC calibration, linear polystyrene standards were used for calibration of the THF GPC.

Figure 5:
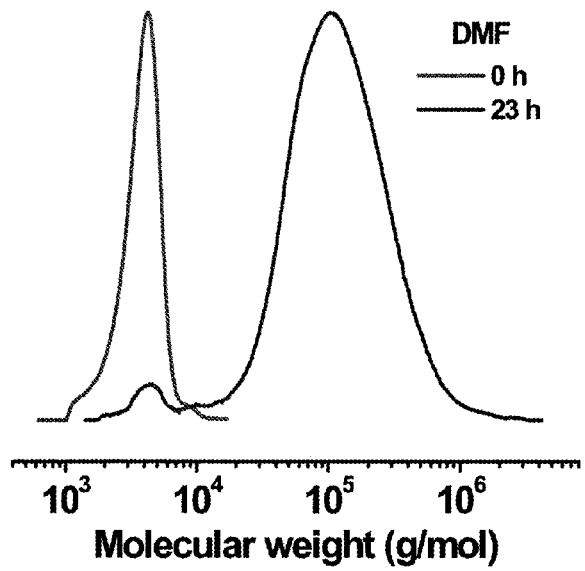

FIG. 5. GPC traces of (PEO)$_n$-polyDVB star polymers by macromonomer strategy using FRP method;

Experimental conditions: [PEO MM (DP 45)]$_0$/[DVB]$_0$/[AIBN]$_0$=1.0/3.0/0.2; [PEO MM]$_0$=0.06 M, linear polyMMA standards for DMF GPC calibration.

Figure 6:
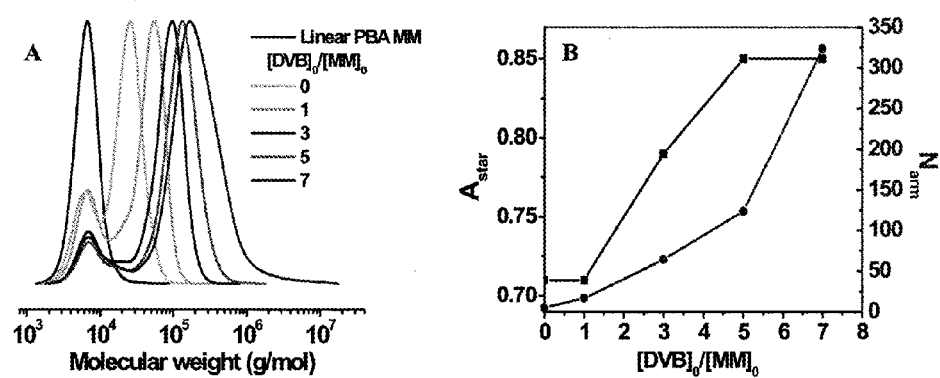

FIG. 6. (A) GPC traces and (B) the effect of DVB amount on the star yield and the average number of arm per star molecule during the synthesis of (polyBA)$_n$-polyDVB star polymers by FRP.

Experimental conditions: [polyBA$_{42}$]$_0$/[DVB]$_0$/[AIBN]$_0$= 1.0/X/0.2, in anisole at 80° C.; [polyBA$_{42}$]$_0$=0.06 M, linear polySt standards for THF GPC calibration (Table 2).

Figure 7:
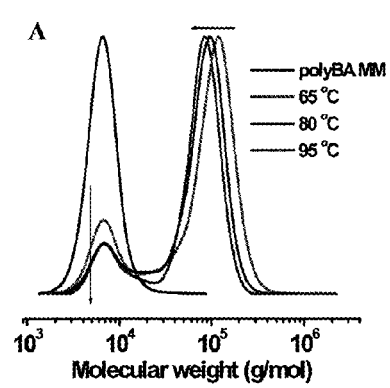
Figure 7:
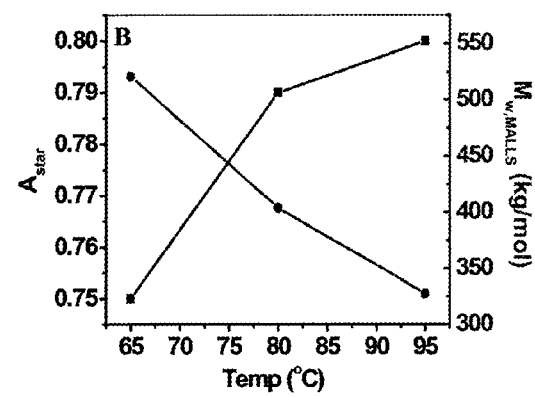

FIG. 7. Effect of reaction temperature on the structures of (polyBA)$_n$-polyDVB star polymers synthesized by FRP;
Experimental condition: [polyBA MM]$_0$/[DVB]$_0$/[AIBN]$_0$= 1/3/0.2; [polyBA MM]$_n$=0.06 M; in anisole; linear polystyrene standards were used for calibration of the THF GPC.

Figure 8:
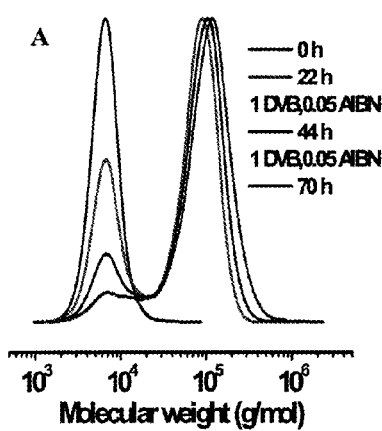
Figure 8:
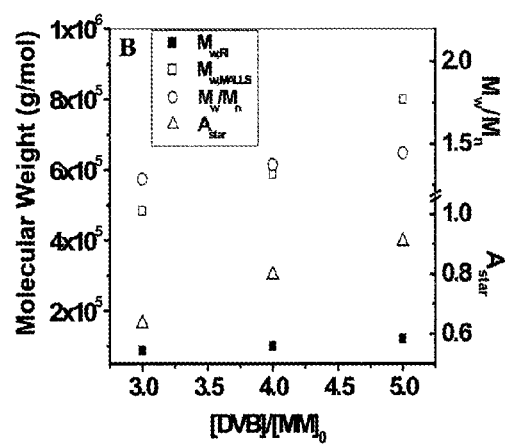

FIG. 8. Run HG-08-40. Synthesis of (polyBA)$_n$-polyDVB star polymers by macromonomer strategy using FRP method;
Experimental conditions: [polyBA MM (DP 42)]$_0$/ [DVB]$_0$/[AIBN]$_0$=1/(3+1+1)/(0.1+0.05+0.05); [polyBA$_{42}$]$_0$= 0.06 M; in anisole at 80° C.; linear polySt standards were used for calibration of the THF GPC.

Figure 9:
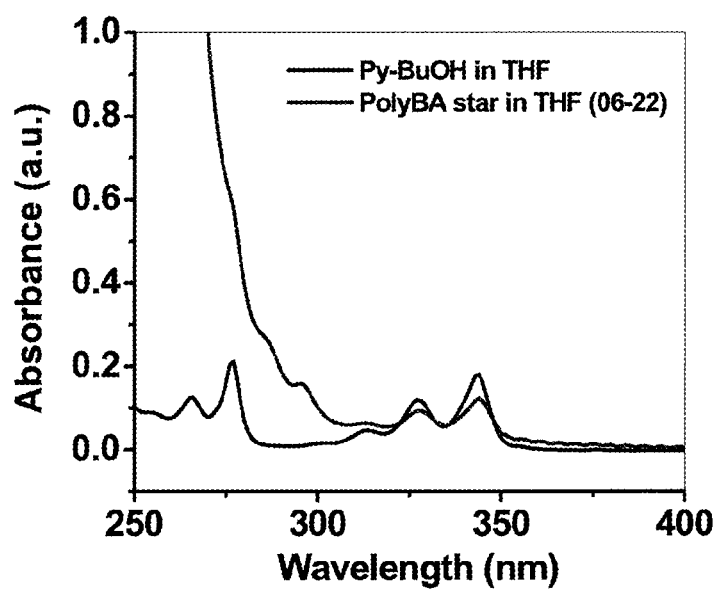

FIG. 9. UV-vis spectra of Py-BuOH and (polyBA)$_n$-polyDVB(pyrene) star polymers in THF (HG-06-22 synthesized by FRP of PBA MM (DP 42) and DVB with 1-pyrene butanol in the media).

Figure 10:
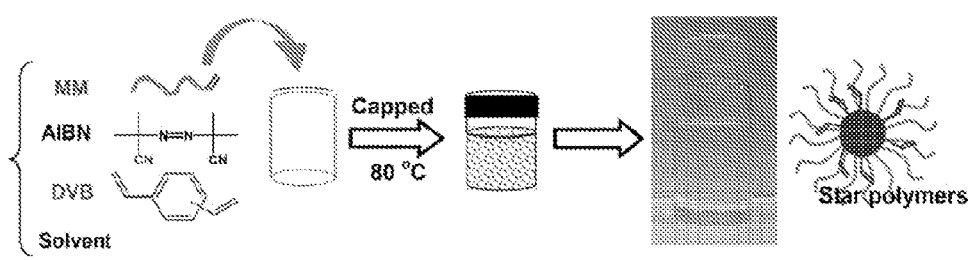

FIG. 10. Scheme 1. Synthesis of core cross-linked star polymers by FRP of MM and divinyl monomer/cross-linker in solution showing image of clear colorless reaction medium after reaction was completed.

Figure 11:
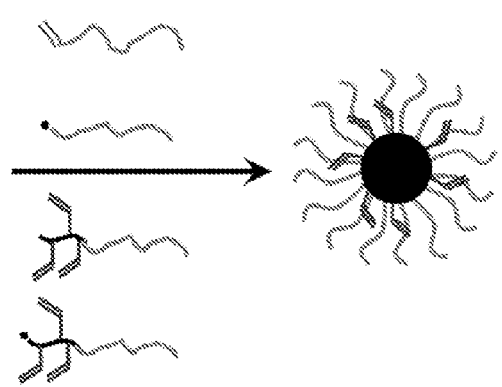

FIG. 11. Scheme 2. Possible mechanisms that could contribute to star growth during FRP of linear MM and divinyl cross-linker.

Figure 12:
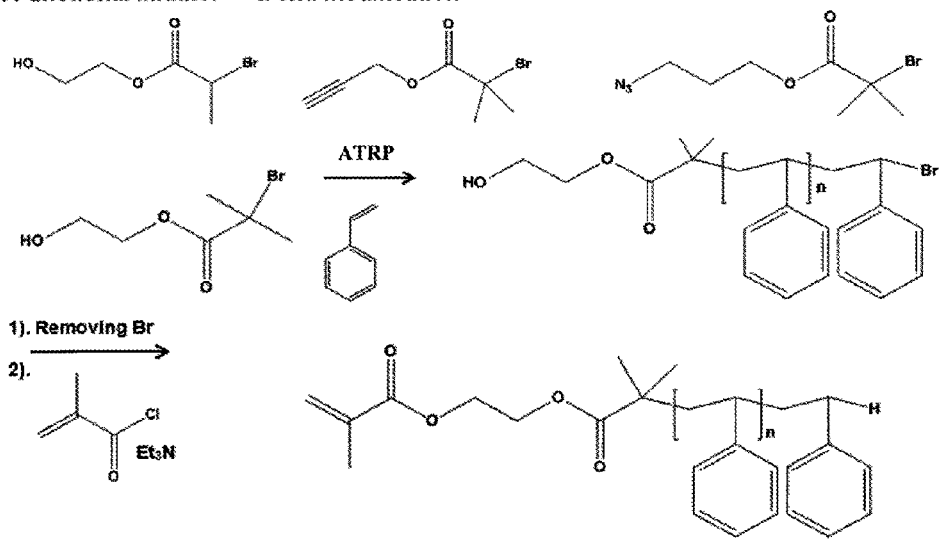
Figure 12:
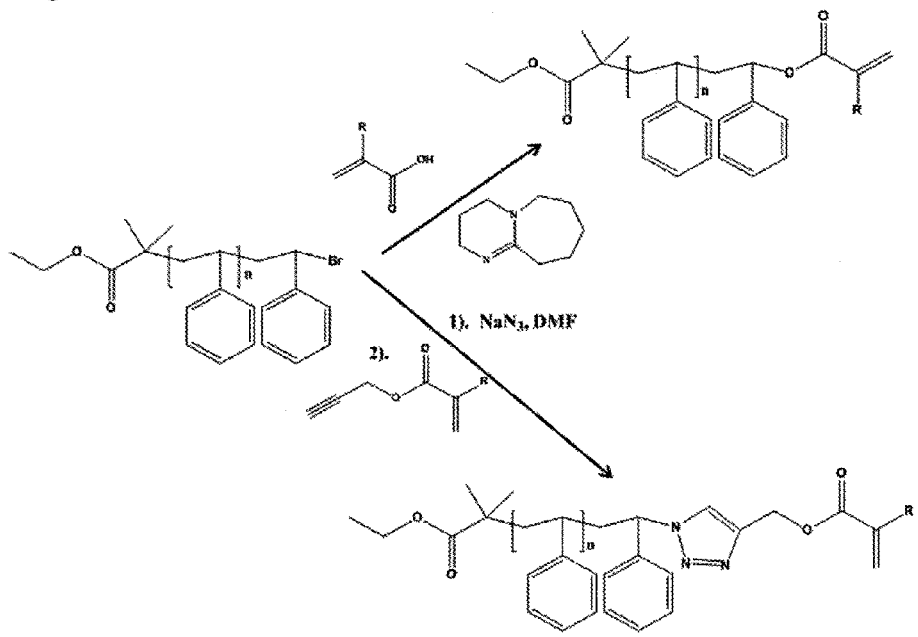

FIG. 12. Scheme 3. Approaches to preparation and functionalization of macromonomers using ATRP.

Figure 13:
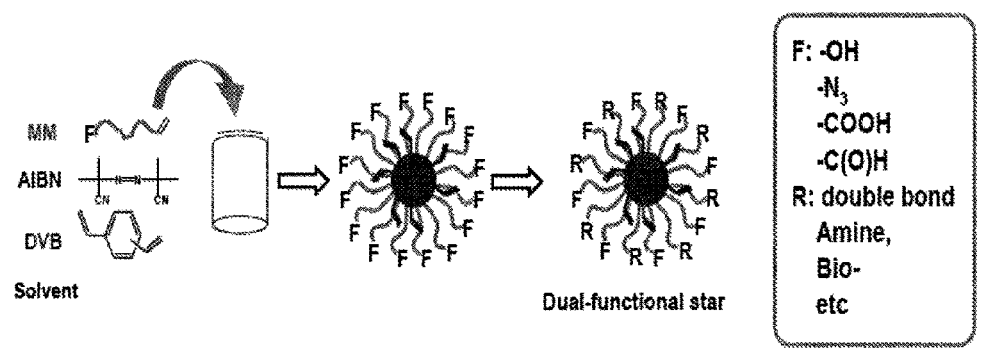

FIG. 13. Scheme 4. Functionalization of the periphery of a FRP polymerized star macromolecule.

Figure 14:
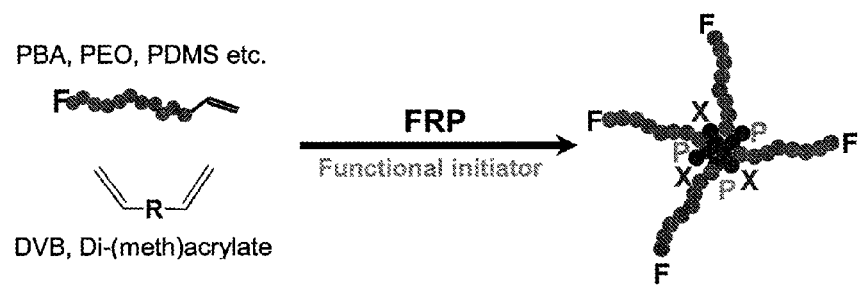

FIG. 14. Scheme 5. Introduction of functional groups into a star polymer, synthesis of core-shell functionalized star polymers with three different functionalities by MM strategy.

SUMMARY OF THE INVENTION

The present invention provides a general method for the synthesis of multi-arm star polymers with high molecular weight and narrow molecular weight distribution and pre-selected site specific functionality using standard free radical polymerization processes.

According to one embodiment, the present disclosure provides a process for the preparation of a star macromolecule. The method comprises copolymerizing a macromonomer having a polymerizable vinyl group and a divinyl monomer in a reaction medium in the presence of a free radical initiator to provide a star macromolecule. According to certain embodiments, the star macromolecule has a polydispersity of less than 2.5.

In still other embodiments, the present disclosure provides a process for the synthesis of multi-arm star polymers with high molecular weight and narrow molecular weight distribution and pre-selected site specific functionality. The process comprises copolymerizing macromonomers having a vinyl group and functionality located on a backbone of the macromonomer with a divinyl monomer by a free radical polymerization process to form the multi-arm star polymer.

A further embodiment of the present invention provides a method for the synthesis of multi-arm star polymers where the core of the star polymers contains additional functionality. This additional functionality can be of direct utility in certain applications or can be employed to tether further functional materials such as stimuli responsive or bio-responsive molecules to the core of the star.

A further embodiment of the present invention provides a method for the synthesis of multi-arm star polymers where the periphery of the star polymers contains additional functionality (ω-functionality—i.e., at the terminal of the macromonomer distal to the star core).

An additional embodiment of the present invention is a general method for the synthesis of star polymers comprising block copolymer arms with high molecular weight and narrow molecular weight distribution.

A further embodiment of the present invention provides a general method for the synthesis of mikto-arm star polymers with high molecular weight and narrow molecular weight distribution.

Therefore in one embodiment of the present invention multi-arm star copolymers are prepared by a free radical (co)polymerization, of a linear macromonomer (MM) with a divinyl cross-linker.

In another embodiment of the present invention the multi-arm star copolymers are prepared by a free radical (co)polymerization, of two or more compositionally different linear macromonomer (MM) with a divinyl cross-linker.

In another embodiment of the present invention multi-arm star copolymers are prepared by a free radical (co)polymerization, of two compositionally different linear macromonomers (MM) with a divinyl cross-linker wherein the second MM is added after the core of the star has formed and the majority of the added free radical initiator has decomposed. The compositionally different macromonomers can be homopolymers, copolymers or segmented copolymers. The macromonomers can comprise terminal functionality and/or functionality distributed along one or more segments of the macromonomer.

DETAILED DESCRIPTION

The present disclosure describes a process for the preparation of star macromolecules, such as star (co)polymers using a free radical polymerization process. The process comprises copolymerizing at least one macromonomer having a polymerizable vinyl group and a divinyl monomer in a reaction medium in the presence of a free radical initiator to provide the star macromolecule having a polydispersity of less than 2.5. As used herein, the terms "star polymer", "star copolymer" and "star macromolecule" are to be considered synonymous.

As used herein, the term "polymerizable vinyl group" means any olefinic functional group that is reactive to free radical polymerization or copolymerization. As used herein, the terms "vinyl" and "divinyl" are intended to encompass structures including mono-, di-, tri- and tetra-substituted olefins that are reactive to free radical polymerization and copolymerization processes.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, may contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary non-limiting embodiments. It is understood, however, that the invention embraces numerous alternative embodiments, which may be accomplished by combining any of the different features, aspects, and embodiments described herein in any combination that one of ordinary skill in the art would find useful.

The Solomon prior art's "arm-first" star synthesis comprising a direct cross-linking of a linear macroinitiator (MI), the "MI method" (U.S. Pat. No. 6,545,095), comprises a "living"/controlled RAFT chain end (i.e., chain end having a group reactive to RAFT polymerization) in addition to a standard free radical initiator. In contrast, the present method discloses cross-linking of a vinyl terminated linear MM, a "MM method", only employs a separate standard free radical initiator species. This may be exemplified in the first examples by the use of azobisisobutyronitrile (AIBN) to initiate the copolymerization of macromonomers. Other FRP initiators can be employed providing procedures for formation of star macromolecules at different temperatures and/or with different solvents/monomers in homogeneous systems or in biphasic systems with aqueous or organic continuous phase. Indeed, other procedures known in the art to generate free radicals can be employed to generate the radical that initiates the copolymerization. A summary of procedures for generation of a radical can be found in Comprehensive Polymer Science volume 3, Permagon Press 1989, ISBN 0-08-036207-9; Chapter 3 George Odian, "Principles of Polymerization, $4^{th}$ edition, Wiley Interscience, 2004, ISBN 0-471-27400-3; or Handbook of Radical Polymerization, Wiley Interscience, 2002, ISBN 0-471-39274-X.

For example, free radicals may be produced by a variety of methods including thermal, photochemical or redox methods. Thermal initiators include suitable compounds that undergo thermally induced homolytic scission, such as peroxides, peroxyesters, or azo compounds, or the spontaneous generation from monomer (e.g., styrene). Thermal initiators include peroxides, hydroperoxides, peresters, peroxydicarbonates, azo-compounds, disulfides, tetrazenes. Photochemical initiation occurs when radicals are produced by ultraviolet or visible light irradiation of a reaction system comprising compounds that undergo excitation by energy adsorption and subsequently decompose forming radicals or interact with a second compound to form a radical by electron transfer or a redox reaction. Many redox reactions also generate radicals and they can be used to initiation a polymerization including decomposition of peroxides in the presence of reducing agents, combination of inorganic reductants with inorganic oxidants, or oxidation of an organic agent such as thiols, oxalic and citric acid or an alkyl halide by an inorganic agent. The initiator should also have the requisite solubility in the reaction medium or monomer mixture.

For thermal generation of free radicals, thermal initiators may be chosen to have an appropriate half life at the temperature of polymerization. Suitable thermal initiators may include one or more of the following compounds: 2,2'-azobis(isobutyronitrile) (AIBN), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N-dimethyleneisobutyramine), 2,2'-azobis(2-methyl-N-[1,1-bis(hydroxymethyl)-2-hydroxyethyl]propionamid-e), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, and dicumyl hyponitrite.

Photochemical initiator systems may be chosen to have the requisite solubility in the reaction medium or monomer mixture and have an appropriate quantum yield for radical production under the conditions of the polymerization. Suitable examples include benzoin derivatives, benzophenone, acyl phosphine oxides, and photo-redox systems.

Redox initiator systems may be chosen to have the requisite solubility in the reaction medium or monomer mixture and have an appropriate rate of radical production under the conditions of the polymerization. Suitable initiating systems may include combinations of the following oxidants and reductants:oxidants:potassium peroxydisulfate, hydrogen peroxide, t-butyl hydroperoxide; reductants: iron (II), titanium (III), potassium thiosulfite, and potassium bisulfite.

According to one embodiment, the present disclosure provides a process for the preparation of star macromolecules having uniform structure, high molecular weight and narrow molecular weight distribution. The process comprises copolymerizing a macromonomer having a polymerizable vinyl group and a divinyl monomer in a reaction medium in the presence of a free radical initiator to provide a star macromolecule having a polydispersity of less than 2.5. Other embodiments may include a process for the synthesis of multi-arm star polymers with high molecular weight and narrow molecular weight distribution and pre-selected site specific functionality comprising copolymerizing macromonomers having a polymerizable vinyl group and functionality located on a backbone of the macromonomer with a divinyl monomer by a free radical polymerization process to form the multi-arm star polymer having a polydispersity of less than 2.5. The copolymerization process occurs by a free radical polymerization (FRP or FRcP) process. According to these embodiments, star macromolecules having high molecular weight and narrow polydispersity may be formed by the claimed process. For example, according to certain embodiments star macromolecules having a polydispersity of less than about 2.5 may be formed. In other embodiments, the polydispersity of the star macromolecule may be less than 2.0, or in specific embodiments less than 1.5.

The macromonomer having a polymerizable vinyl group reacts with the divinyl monomer via the free radical polymerization, wherein the residue of the polymerizable vinyl group and the residue of the divinyl monomer located near the core of the formed star macromolecule. According to specific embodiments, the macromonomer may comprise additional structural features and/or functionality to produce star macromolecules with site specific functionality. For example, according to certain embodiments, the macromonomer may comprise ω-functionality (i.e., functionality at or near the end of the macromonomer opposite the polymerizable vinyl group). According to these embodiments, the resulting star macromolecule may have functionality at the surface of the star structure (i.e., at the periphery of the star structure) which may correspond to the ω-functionality, or alternatively, to functionality produced by further reaction of the ω-functionality. In other embodiments, the macromolecule may comprise α-functionality (i.e. functionality located near the end proximal to the polymerizable vinyl group on the monomer structure), in addition to the polymerizable vinyl group. According to these embodiments, the resulting star macromolecule may have additional functionality (corresponding to the α-functionality) located near the core of the star macromolecule. In other embodiments, the macromonomers may comprise additional functionality distributed at one or more positions along the macromonomer chain. In these embodiments, the resulting star macromolecule may have functionality located at specific sites within the star structure.

According to specific embodiments, the molecular structure of the star macromolecule may be modified by variation of the molar ratio of the macromonomer to the divinyl monomer to the free radical initiator (MM:DV:I). As is described herein, by varying the molar ratio of one or more of these components, the structure of the resulting star polymer may be controlled. For example, in one embodiment the ratio of the divinyl monomer to the free radical initiator may control the size of the formed core and varying this ratio may result in different core sizes.

Further, in specific embodiments, the structure of the star macromolecule may be controlled by the timing of the addition of the divinyl monomer and/or the free radical initiator to the reaction medium. For example, in certain embodiments, the divinyl monomer may be added to the reaction medium periodically (i.e., additional divinyl monomer may be added as the reaction proceeds). In another embodiment, the free radical initiator may be added to the reaction medium periodically. According to these embodiments as the additional divinyl monomer or free radical initiator are added, the additional component may react with radical groups and/or vinyl groups in the core, thereby expanding the core structure and allowing for the addition of more arms.

According to another embodiment, the process may comprise adding more than one type of free radical initiator to the reaction medium. For example, free radical initiators having different reactivities or different initiation mechanisms may be added to the reaction medium. In another embodiment, more than one type of free radical initiator may be added to the reaction at different times. In these embodiments, the first free radical initiator may initiate polymerization, while the second free radical initiator (the less reactive one or the one added at a later time) may then react with vinyl groups in the formed core, expanding the initial core structure and producing additional radicals at the core which may then react with additional macromonomers to add more arms to the star or react with additional divinyl monomers to expand the core size.

In certain applications, star macromolecules with functionalized cores may be desired. According to certain embodiments, the free radical initiator may comprise an additional functional group. In these embodiments, the additional functional group on the free radical initiator may be incorporated into the core structure of the star macromolecule, resulting in a star structure with a functionalize core. In another embodiment, the process may further comprise adding a low molecular weight mono-vinyl monomer to the copolymerization step. The mono-vinyl monomer may then modify the core of the star, for example by being incorporated into the core of the star by reacting with a radical at the core. In specific embodiments, the low molecular weight mono-vinyl monomer may comprise one or more additional functional groups. In these embodiments, incorporation of the mono-vinyl monomer into the core forms a functionalized core. As used herein, the term "low molecular weight" means a mono-vinyl monomer having a molecular weight of less than 500 g/mol or even less than 200 g/mol.

Still other embodiments may comprise adding a low molecular weight functional molecule to the copolymerizing step. According to these embodiments, the low molecular weight functional molecule may not chemically react with the star macromolecule but instead be encapsulated within the core of the star macromolecule during the copolymerization process. Suitable functional molecules include, but are not limited to, bioactive molecules, fluorescent molecules, and the like.

In specific embodiments, the copolymerization may be conducted in a homogeneous solution. In certain embodiments, the copolymerization may be conducted at relatively dilute macromonomer concentrations. For example, in certain embodiments, the macromonomer concentration may range from about 0.0001 Molar (M) to about 0.5 M. In other embodiments, the macromonomer concentration may range from about 0.0001 M to about 0.1 M. As described herein, the star macromolecule formation process may also be conducted predominantly in one phase of a bi-phasic reaction medium. For example, the copolymerization may be conducted in one phase of an emulsion system, such as a mini emulsion or a micro emulsion. According to these embodiments, the copolymerization occurs in one phase since diffusion of the monomer across the interphase surface is not favored. Thus, when conducted in a mini- or micro-emulsion, the reaction shows good macromonomer incorporation. Without intending to be limited by any interpretation, it is believed that the reaction proceeds as if the process is occurring in an isolated bulk solution in the dispersed phase. The present process does not require micellization and allows incorporation of a much higher fraction of the added linear macromonomers, greater than 50%, preferable greater than 75% and optimally greater than 85%. As used herein, the fraction of incorporation of the macromonomers means the percentage of the added macromonomers that are incorporated into the star polymer structures. For example, a reaction having greater than 50% macromonomer incorporation means that greater than 50% of the macromonomers are reacted with cores of the produced star macromolecules and less than 50% of the macromonomers do not react in the process. In certain embodiments, the unreacted macromonomers may be recovered and recycled in subsequent polymerizations. In has been discovered that conducting the polymerization process in a homogeneous solution or in an emulsion such as a micro- or mini-emulsion provides for increased macromonomer incorporation compared to using micelles.

According to various embodiments, the star macromolecules formed by the processes described herein may comprise arms that predominantly comprise the added macromonomer. That is, the copolymerization process results in star macromolecules having arms formed predominantly by the macromonomers and not by an oligomer or polymer of the divinyl monomer. As used herein, the term predominantly means greater than 90% of the composition or even greater than 95% of the composition.

In specific embodiments of the copolymerization, two or more different macromonomers may be added to the copolymerization and one or more arms of the star macromolecule may comprise a different composition that one or more other arms of the star macromolecule. That is, the star macromolecule will have arms of different compositions, corresponding to the compositions of the two or more different macromonomers added to the copolymerization process. The different macromonomers may have different polymer structure and/or different functionality (for example, different α- or ω-functionality, or different functionality along the macromonomer structure) For example, according to certain embodiments, the two or more different macromonomers may comprise different ω-functionality and one or more arms of the star macromolecule may comprise different peripheral ω-functional groups. In another embodiment, the two or more different macromonomers may have different polymeric structure. In another embodiment, the two or more different macromonomers may have different reactivities, for example reactivity to the free radical polymerization. In these embodiments, star formation initially occurs with the more reactive macromonomer and as the concentration of the more reactive macromonomer decreases the less reactive monomer is incorporated into the star.

In specific embodiments, the first macromonomer may be initially present in the copolymerizing step and the second or additional monomer(s) may be added to the copolymerization after a specific amount of the initially added free radical initiator has decomposed (or reacted). According to these embodiments, the first macromonomer may react to form an initial star core and the second macromolecule may be incorporated into a larger core. For example, in certain embodiments the second macromonomer may have a smaller/less bulky structure which allows the second macromonomer to access the core structure in-between the first macromonomer arm structure. According to one embodiment, the second or additional monomer(s) may be added to the copolymerization after more than 50% of the initially added free radical initiator has decomposed. In other embodiments, the second or additional monomer(s) may be added to the copolymerization after more than 75% of the initially added free radical initiator has decomposed. In still other embodiments, the second or additional monomer(s) may be added to the copolymerization after the core of the star has formed and after a majority of the initially added free radical initiator has decomposed.

It has been discovered that in the claimed reaction process, the reaction may proceed even after a significant amount of the free radical initiator has decomposed. Without intending to be limited by any theory, it is believed that the reaction conditions provide an environment where radicals may be trapped in or at the core of the star polymer. For example, it is believed that the core polymeric structure may be so viscous that the radical cannot migrate out of the core to react and remains "trapped" or un-reacted at or near the core (i.e., the radical species has a long life time). Since the radical does not migrate out of the core, radical reactions occur at the core and the resulting star copolymer has a well defined core-arm structure, as represented by the observed low polydispersities. For example, the trapped radical may then react with added macromonomer (or alternatively other added reactive species, such as an additional free radical initiator having an additional functional group, a low molecular weight monovinyl monomer, etc.) at the core to provide a well defined structure. According to specific embodiments, the Tg of the core structure may be greater than the reaction temperature. In these embodiments, the resulting core structure has a well defined, non-viscous structure that may trap radicals as described herein.

Specific embodiments of the process may form a star macromolecule where the molecular structure of the star macromolecule (such as, the number of arms) may be modified by variation of the bulkiness of the monomer units close to the a-chain end of the macromonomer. In these embodiments, the macromonomer may be a gradient or a block copolymer. For example, in certain embodiments the monomer units near the a-chain end may be relatively bulky, creating a sterically hindered environment at the core and limiting the total number of arms that may be attached to the core. As used herein, the term "bulky" means that the environment around the core is sterically hindered (for example, by the size of groups on those macromonomers that have already been incorporated into the star structure) so that the size of further reactive species, such as the macromonomer or the low molecular weight mono-vinyl monomer, can hinder the reaction of the reactive species with radicals at the core of the star macromolecule. Alternatively, the monomer units near the α-chain end may be non-bulky, creating a relatively open, non-sterically hindered environment at the core and increasing the total number of arms that may be attached to the core. Thus, certain embodiments may include a process where the macromonomer may comprise a gradient copolymer or block copolymer with a short block of desired sterics at the α-end to provide the desired reactivity in a core formation reaction or a core growth reaction.

The novel procedure according to the present disclosure may be initially exemplified by copolymerization of a poly (n-butyl acrylate) macromonomer, (polyBA MM), and a divinyl molecule initially exemplified by divinylbenzene, (DVB). In this new MM FRP method for preparation of multi-arm star polymers, the molar ratio of fragments of the FRP initiating sites encapsulated within the core and the number of arms in the star polymer is determined by several independent factors: the actual amount of initiator added to the reaction and composition of both the macromonomer and crosslinking agent, and optional mono-vinyl monomer, added to the reaction.

In contrast to prior art disclosures, the present description describes the first synthesis of narrow polydispersity star polymers in high star yield by conventional FRP of linear MM and a divinyl cross-linker, such as DVB, in a homogeneous solution. However, it is also expected that biphasic systems such as miniemulsion would also be suitable for this procedure since miniemulsion systems have been shown to function as dispersed bulk reactors. [Min, K.; Gao, H.; Matyjaszewski, K. *Journal of the American Chemical Society* 2005, 127, 3825-3830.]

Some advantages of conventional FRP for star synthesis compared to other polymerization techniques are illustrated in Scheme 1 (see FIG. 10) and include, but are not limited to: no deoxygenation process is required prior to reaction; no costly synthesis of controlled radical copolymerization mediating agents, RAFT transfer agents or alkoxyamines; and no catalyst contamination in the final product.

Figure 1:
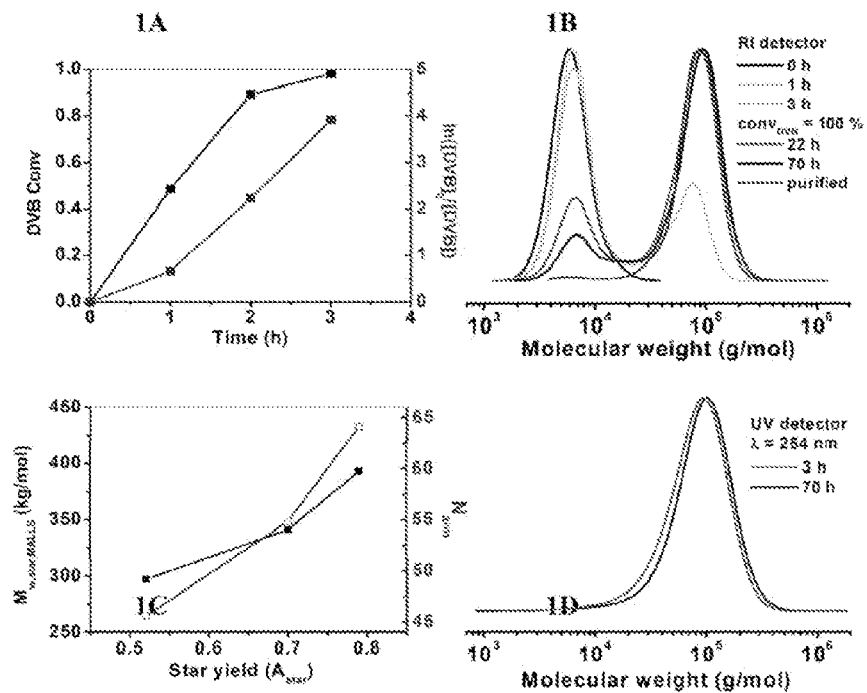
FIG. 1. (A) Dependence of DVB conversion and $\ln([M]_0/[M])$ on reaction time, (B) evolution of GPC traces with RI detector and (C) evolution of GPC traces with UV ($\square \lambda$ 254 nm) detector, (D) dependence of star molecular weight and arm number during synthesis of (polyBA)$_n$-polyDVB star polymers by FR method.

The synthesis of star polymers using conventional solution FRP techniques can be exemplified by the copolymerization of poly(n-butyl acrylate) (polyBA) MM (DP=42) with 3 eq. of DVB by using 0.2 eq. of AIBN as thermal initiator. The polymerization procedure was straight forward and was conducted without any deoxygenation process. All components were placed in the flask before it was capped and immersed in an 80° C. oil bath to initiate the reaction (Scheme 1, FIG. 10). The limited amount of oxygen that remained in the reaction system would be consumed first by the radicals generated from AIBN before the star formation began. At timed intervals, samples were withdrawn for measurement of DVB conversion and polymer molecular weight. As shown in FIG. 1A, the conversion of DVB determined by GC essentially reached 100% after 3 h, however the star yield continued to increase until 70 h, which was confirmed by a decreasing RI signal of the linear polyBA macromonomer precursors.

Star-star coupling was suppressed through selection of a linear MM with bulky side groups which effectively isolated the reactive groups within the star core and produced star polymers with well-defined structure.

The area fraction of (polyBA)$_n$-polyDVB star polymers, determined by multi-peak splitting of the GPC curve using Gaussian function, was $A_{star}$=79% at 70 h.

The star polymers obtained after 70 h were easily purified by fractional precipitation to remove the non-reacted linear chains (FIG. 1B). The linear chains retain their terminal vinyl-functionality and can be recycled to the next batch. The purified star polymer had a low polydispersity ($M_w/M_n$=1.30) and its apparent molecular weight, $M_{w,RI}$=90.9 kg/mol$^{-1}$ was lower than the absolute molecular weight $M_{w,MALLS}$=392.5 kg/mol$^{-1}$, indicating the compact structure of the star polymers. The average number of arms per star molecule was calculated as $N_{arm}$=64.1 based on the absolute molecular weight of the star polymers and the weight fraction of polyBA arms in the stars. Although there was no free DVB in the system after 3 h, the star continued to grow until 70 h with increasing star yield but little change in the hydrodynamic volume of the star in THF (FIG. 1B).

Scheme 2 (see FIG. 11) illustrates four possible pathways that could contribute to star growth via incorporation of linear chains into preformed stars with limited star-star coupling. GPC analysis of the star polymers coupling with UV detector, $\lambda$=254 nm, which is only sensitive to phenyl rings from DVB units, excluded the existence of linear precursors with pendant vinyl groups in the unincorporated linear chains, mechanisms 3 and 4, because of the absence of UV signal representing the linear precursors containing phenyl groups (FIG. 1C). Since the decomposition half life time of AIBN at 80° C. is ca 1.5 h, the continuous star growth from 22 h to 70 h eliminates the existence of linear chain-end radicals, pathway 2, and supports a hypothesis that the star growth was accomplished via pathway 1. The propagating radicals residing in the highly cross-linked core have a long life time and little chance for bi-radical termination due to limited mobility in the highly viscous polyDVB network. The incorporation of additional linear MM (1) into pre-formed star molecules increased the absolute molecular weight of star polymer and the average number of arms per star molecule (FIG. 1D), instead of dramatically changing the hydrodynamic size of the stars in THF.

The well-defined structure of the formed (polyBA)$_n$-polyDVB star polymers is attributed to the proper selection of bulky polyBA MM and DVB as cross-linker, which significantly suppressed star-star coupling reactions. When a MM, with a "thinner" structure, such as a polyethylene oxide (PEO) MM, was used as the arm precursor the resulting (PEO)$_n$-polyDVB star polymers were isolated in higher star yield ($A_{star}$=95%) but a slightly broader molecular weight distribution ($M_w/M_n$=1.97) was obtained due to more extended period of star-star coupling.

As used herein, "thinner" means that the macromonomer has a less sterically hindered structure along the macromonomer backbone, which may allow the macromonomer access to the reactive radicals at the core of the star polymer structure. For example, a mikto-arm star can be prepared by addition of the "thinner" MM to the reaction medium after the core has formed but while radicals remain trapped within the core. The less congested vinyl chain end of a MM, such as a PEO MM, can more easily penetrate the congested shell of the first formed core additionally comprising trapped radicals and be incorporated into the star forming an amphiphylic star nano-structure that can respond to changes in the environment. If one desires to add a "thicker" MM in the second stage of the formation of the star macromolecule a small fraction of mono-vinyl monomers may be added at the same time as the second MM to expand the size of the core and make the available trapped radicals accessible to the second MM.

As noted above, while not intending to be restricted to a particular mechanism, one possible factor influencing the accessibility of the terminal vinyl group in a MM is dependant on the structure of the terminal monomer units in a polymer chain. The monomer units closer to the final vinyl functionality can be preselected in a "living" polymerization process including controlled radical polymerization (CRP) processes such as ATRP, nitroxide mediated polymerization (NMP) or reversible addition fragmentation transfer (RAFT) polymerization to comprise monomer units of desired bulk, or lack of bulk, by preparation of a gradient copolymer or block copolymer with a short block of desired "bulkiness" or sterics to provide the desired reactivity in "core formation" reactions or "core growth" reactions. In this manner the majority of the monomer units in the tethered arms can comprise any desired functionality while control is exercised over the size and composition of the star core.

The use of DVB as comonomer showed advantages for structural control of the star polymer, compared to the homopolymerization of polyBA MM and copolymerization by using styrene or EGDA (ethyleneglycol diacrylate) as comonomer which can be attributed not only the divinyl nature of DVB, but also to the fact that DVB provides a more rigid structure for the polyDVB core, which protected the radicals entrapped in the core from diffusing and coupling with each other and suppressed star-star coupling. Appropriate selection of crosslinking agent(s) and reaction conditions can allow other divinyl monomers to approach the physical attributes of the exemplifying DVB core.

According to certain embodiments, the properties of the core can be further modified by incorporation of a low molecular weight mono-vinyl monomer. The low molecular weight vinyl monomer can act to decrease the crosslink density of the core of the star molecule, modify the phylicity of the core, incorporate functionality into the core and modify the Tg of the core.

Several parameters affected the structure of the (polyBA)$_n$-polyDVB star polymers. Higher initial concentrations of DVB resulted in formation of star polymers with higher star yield, higher molecular weight, but broader size distribution.

Increasing the amount of AIBN initially added to the reaction, or increasing the reaction temperature which has a similar effect, leads to higher a yield of lower molecular weight star polymers; because more radicals are generated early in the reaction resulting in formation of more star polymers with smaller size.

Therefore a new method for the preparation of functional star macromolecules is disclosed and rather surprisingly this new procedure of conducting a free radical crosslinking copolymerization of macromonomers provides multi-arm star copolymers displaying a narrow size distribution, procedures for control over the size of the star core and furthermore provides procedures for introducing functionality to specific sites throughout the molecule.

This development is surprising since when one attempts to prepare a homopolymer of a poly(butyl acrylate) macromonomer, (PBA MM), (Mn=5,600 g/mol; DP=42) by conducting a "grafting through" controlled radical polymerization process, ATRP, the degree of polymerization (DP) of the obtained homopolymers was very small (DP-12) due to steric congestion around the single active chain end. [Ohno, S.; Matyjaszewski, K.; *Journal of Polymer Science Part A*, 2006, 44 19, 5454-5467.] The resulting brush-graft polymer, with a short backbone, could be considered to be a star polymer with a single inaccessible initiating group encapsulated within the core of the star. It is believed, without limiting the procedure in any way, that in one embodiment of the invention disclosed and exemplified herein that copolymerization of a MM with a difunctional monomer can reduce the degree of congestion around the active polymerization sites within the core of the forming star polymer and in one embodiment allow more than 10 macromonomer units to be incorporated into the star, and under certain conditions taught herein more than 20 arms can be joined together, and even up to more than 100 arms to be linked together.

The broad utility of this approach was initially demonstrated by the synthesis of a series of star polymers with high molecular weight, high star yield, narrow molecular weight distribution and high chain-end functionality with differing overall molecular weights and star structure and when functional crosslinking agents, such as crosslinking agents comprising degradable units between the two vinyl groups, are involved in the formation star macromolecules comprising functional cores can be prepared.

According to another embodiment, another approach to prepare functional core star macromolecules is the addition of a functional monomer, either a low molecular weight monomer of a MM comprising a functional group close to the terminal vinyl group, to the copolymerization. This is exemplified by incorporation of fluorescent units into a star core.

Without intending to be limited to any proposed mechanism, it is envisioned that in the first stage each radical formed by decomposition of a standard free radical initiator initiates the copolymerization of the divinyl monomer with the macromonomer forming a primary macromolecule with one or more attached vinyl groups. The formed primary macromolecule continues to react with macromonomers, divinyl monomers and unsaturated groups present in other primary macromolecules and through macromolecule-macromolecule coupling reactions and star-linear polymer reactions forming multiarm star molecules with an increasingly congested core protected from further core-core coupling reactions by the multiple tethered arms.

Compared to the star polymers synthesized by ATRP under similar conditions, the $(polyBA)_n$-polyDVB star polymers produced by conventional FRP had similar star yield, but higher molecular weight. The principle difference between the reactions was that the FRP synthesis is extremely easy and the product in THF is colorless and no additional purification step is required. In contrast, the stars synthesized by ATRP showed light yellowish color in THF even after passage through an alumina column, indicating the big advantage of applying FRP technique to star synthesis, FIG. 2.

In summary, a novel broadly applicable FRP method was demonstrated for synthesis of well-defined star polymers with high molecular weight and high star yield by applying a conventional solution based FRP of linear MM and crosslinker. The reaction could be easily set up on a bench top without the deoxygenation step and the final product was free of catalyst contamination.

The method can be expanded to other MM's and is attractive approach to prepare star nano-materials without the requirement of special skills or special equipment.

The first macromonomers can be prepared by any living/controlled polymerization process and can incorporate desired functionality at either chain end or distributed along the chain or in any chain segment.

Taking ATRP, as one exemplifying controlled polymerization process for the preparation of a macromonomer, functionality can be introduced at the α-chain end simply by employing a functional initiator or at the ω-chain end by transforming the first terminal halogen atom into the desired functionality, Scheme 3 (see FIG. 12).

Appropriate selection of the chain ends can functionalize the periphery of the formed star nano-structure, Scheme 4 (see FIG. 13).

Another feature of the synthesis of star polymers using this MM method is that the reaction is highly reproducible. For any two independent reactions with the same initial composition and experimental conditions, the star polymers produced had the same molecular weight and star yield indicating that the structure of the star polymers are determined by selection of the initial reaction conditions. This allows for large-scale production of well defined nano-structures with reproducible properties suitable for use in coating applications or as vibration dampeners.

Variation in the composition and molar ratio of the different reagents employed in the reaction can be used to change the structure of the star polymer. Less congestion within the core and presence of more vinyl groups contribute to higher star yield. A larger star core contributes to higher star molecular weight.

Copolymerization of a functional mono-vinyl monomer during the star core formation generally produced star polymers with higher molecular weight distribution, because the monovinyl monomer reduces star core congestion and increases the possibility of star-star coupling reactions. Addition of the mono-vinyl monomer after the majority of the added FRP initiator has decomposed and star core formation has occurred can decrease core congestion and increase amount of second MM incorporated into the core or optionally can add functionality to the core.

In a further embodiment of the invention based on the synthetic features developed and discussed various kinds of functional groups can be introduced into the star core simply by using the corresponding functional free radical initiators, the group P in Scheme 5 (see FIG. 14), which provides a method to synthesize core-functionalized star polymers. This is exemplified below by use of initiators further comprising a function group such as a hydroxide or tethered responsive functional group such as pyrene. ω-functional macromonomers (group F) can additionally be used to provide even more site specific functional materials, see Scheme 5, FIG. 14. In a further embodiment of the invention the radically polymerizable difunctional monomer units can be selected to modify the composition and phylicity of the formed star core while they would be expected to interact with added macromonomers in a similar manner. The "R" group in the radically polymerizable difunctional monomer units shown in Scheme 5 (see FIG. 14) can additionally be employed to incorporate additional functionality such as degradability into the star core.

The functional initiator, i.e. where a functional group is present on the incorporated residue of the initiator, can be the only initiator employed in the reaction or two or more different initiators can be employed to incorporate different functional groups at different times into the core of the star. The functional initiator can be added at the beginning of the reaction or added later to incorporate the functionality in the outer fraction of the core of the star.

Another means of incorporating functionality into the star macromolecule is exemplified by incorporation of a hydrophobic pyrene group into the core section of a hydrophilic PEO star polymer produces pyrene-containing water-soluble PEO star polymers which mimic a micelle structure but the functional star copolymer is much smaller and much more stable than normal micelles formed by self assembly of block copolymers.

In a further embodiment of the invention, the copolymerization of a polyethylene oxide (PEO) macromonomer provides an example of synthesis of a water soluble star macromolecule by the disclosed procedure. Incorporation of a pyrene molecule, a pyrene-initiator or a pyrene containing MM into the core of the star exemplifies procedures for the solubilization of an insoluble drug by encapsulating or tethering the molecule to a water soluble molecule thereby providing a means for transportation through the body.

Indeed the incorporation of a pyrene functional molecule is exemplary of many possible functional molecules and herein exemplifies how functional molecules such as drugs or photoresponsive molecules can be attached to a star molecule for delivery to physio-selective environments and demonstrates how the composition of the arms in a pyrene containing star molecule can be selected to dissolve in different solvent media while retaining the photo-responsive properties of the pyrene molecule.

In addition to formation of mikto-arm star copolymers by sequential addition on two different MM, mikto-arm star copolymers may be prepared by simultaneous copolymerization of two or more different macromonomers. In a standard preparation of a mikto-arm star copolymer, i.e. with two or more different copolymer arms, the reaction can be conducted in a good solvent for both macromonomers to allow random incorporation of each MM into the star. One or more of the macromonomers can possess a masked functional group, as exemplified below by the copolymerization of n-butyl acrylate macromonomer with a t-butyl acrylate macromonomer followed by hydrolysis of the t-butyl group thereby providing a mikto-arm star with hydrophilic and hydrophobic arms. Such a star surfactant could be used as a compatibilizer or provide solubility of an encapsulated agent in a range of solvents.

Furthermore, it has been very difficult to synthesize mikto-arm star copolymers containing two or more kinds of functional groups on the periphery of the star. As shown in Scheme 4 (see FIG. 13) this can be accomplished by forming macromonomers that will be incorporated into the star macromolecules or mikto-arm stars by the disclosed controlled polymerization process. The composition of the MM arms can be the same or different and the molecular weight of the arms can be the same or different and the ratio of each MM can be varied at will.

In another embodiment, employing initiating species containing different second functional groups can incorporate the second functionality into the core of the star. This approach therefore allows control over the molar ratio of the two or more kinds of arms in the final star and easy introduction of two or more kinds of functional groups at the periphery of the star and incorporation of functionality into the core of the star.

There is no need to limit the composition of the mikto-arm stars to two different types of arms since three or more different macromolecules can be incorporated into a star copolymer by these disclosed processes.

HPLC analysis confirms the distribution of arms in the star which would indicate chemical compatibility of arms in the star, no microphase separation or Janus formation. However the arms retain their chemical identity as exemplified herein by polyBA-PEO mikto-arm star molecules wherein the mikto-arm star macromolecules are doubly responsive, for example the polyBA-PEO mikto-arm star can be dispersed both in toluene and MeOH: i.e. each type of arm acts to solubilize the star in an appropriate solvents. This is further exemplified by a poly-n-BA-poly-t-BA mikto-arm star, after hydrolysis, it can be dispersed in both toluene and basic water.

As taught herein to one skilled in the art, in various embodiments, changing the overall amount of both crosslinking agent and initiator can change the topology and molecular weight of the final star polymer in a predictable manner.

By selecting additional functional groups at the co-termini of the macromonomers, initiators and crosslinking agents the functionality on the periphery, the throughout the arm or within the core of the star macromolecules can be varied in a predictable manner.

EXAMPLES AND DISCUSSION OF EXAMPLES

In the following set of examples comments are made about the yield of the star copolymer under a certain set of conditions. Yield is defined as the percentage of MM incorporated into star macromolecules not the molecular weight of the formed star. The examples employ homopolymer macromonomers but copolymer macromonomers can be employed. The copolymer macromonomer can incorporate distributed functional groups.

Materials.

Divinylbenzene (DVB, 80%, Aldrich) was purified by passing through two columns filled with basic alumina to remove the inhibitor. 2,2'-Azobisisobutylronitrile (AIBN) was recrystallized from ethanol. Poly(ethylene oxide) methyl ether methacrylate MM (PEO MM) with $M_n$ ~2,080 g/mol (50 wt % solution in water, Aldrich) was extracted into methylene chloride from the aqueous solution, followed by the rotary evaporation of methylene chloride to provide the pure macromonomer. Poly(n-butyl acrylate) (polyBA) MM containing an acrylate chain-end group (polyM$_{n,theor}$=5.48 kg/mol, $M_w/M_n$=1.05) was generously provided by Kaneka (Japan) and was used as received. These linear MMs were synthesized by ATRP of BA using a method similar to that reported in the open literature. [Ishizu, K.; Sunahara, K. Polymer 1995, 36, 4155] All other reagents and solvents were purchased from Aldrich with the highest purity and used as received without further purification.

Synthesis of (polyBA)$_n$-polyDVB star polymers by FRP of polyBA MM and DVB.

A typical procedure is briefly described: starting with a ratio of reagents [polyBA MM]$_0$/[DVB]$_0$/[AIBN]$_0$=1.0/3.0/0.2.

PolyBA MM (2 g, 292 μmol), DVB (0.156 mL, 1.09 mmol), AIBN (19.3 μL, 73 μmol) and anisole (4 mL) were added to clean dry Schlenk flask. The flask was sealed with a glass stopper and immersed in an oil bath at 80° C., without any deoxygenation process. At timed intervals, samples were withdrawn from the flask via a syringe fitted with stainless steel needle and immediately diluted with THF. The samples were used to measure DVB conversions by gas chromatograph (GC) and polymer molecular weights by gel permeation chromatography (GPC), respectively. The reaction was stopped after 70 h by exposure or the reaction media to air and dilution with THF. The final star product was purified by precipitation into cold methanol and drying under vacuum at 60° C.

Characterization.

Cross-linker conversions were determined from the concentration of the unreacted cross-linker in the samples periodically removed from the reactions using a Shimadzu GC-14A gas chromatograph, equipped with a capillary column (DB-Wax, 30 m×0.54 mm×0.5 J&W Scientific). Anisole was used as internal standard for calculation of monomer conversion. The polymer samples were separated by GPC (Polymer Standards Services (PSS) columns (guard, $10^5$, $10^3$, and $10^2$ Å), with THF or DMF eluent at 35° C., flow rate=1.00 mL/min. Differential refractive index (RI) detector (Waters, 2410)), UV detector (Waters, 2487) and evaporative light scattering (ELS) detector (Polymer Laboratories, PL-ELS1000) were used to connect with the GPC. The apparent molecular weights and polydispersity ($M_y/M_n$) were determined by using the RI detector with a calibration based on linear polystyrene (polySt) or poly(methyl methacrylate) (polyMMA) standards using WinGPC 6.0 software from PSS. Area fractions of both star and linear polymers were determined by multi-peak splitting of the GPC curve using the Gaussian function in ORIGIN® 6.0 software. The resulting GPC curves, with flat baseline, were imported into the WinGPC software for calculation of the apparent molecular weights and polydispersity of the star and linear polymers. The detectors employed to measure the absolute molecular weights ($M_{w,MALLS}$) were a triple detector system containing RI detector (Wyatt Technology, Optilab REX), viscometer detector (Wyatt Technology, ViscoStar) and a multi-angle laser light scattering (MALLS) detector (Wyatt Technology, DAWN EOS) with the light wavelength at 690 nm. Absolute molecular weights were determined using ASTRA software from Wyatt Technology.

Selection of MM and Cross-Linker.

It is important to note that the successful synthesis of (polyBA)$_n$-polyDVB star polymers (entry S-BD1, Table 1) depended largely on the proper selection of linear polyBA MM as arm precursor and DVB as cross-linker. When ethylene glycol diacrylate (EGDA) was selected to replace DVB as the cross-linker for the FRP with polyBA MM, a star macromolecule with a broader multimodal GPC peak was observed, indicating a poor control of the structures of (polyBA)$_n$-polyEGDA star polymers (FIG. 3). Under the same polymerization conditions, the conversion of EGDA reached 100% within 15 min, which was much faster incorporation of the crosslinker into the forming star macromolecule when compared to the copolymerization of DVB due to the higher propagation rate constant of acrylate. Although the polyBA MM also contains an acrylate chain-end group, the long polyBA chain could affect the diffusion rate of the chain-end acrylate group, which decreases the apparent reactivity of polyBA MM, at least much lower than that of EGDA. Therefore, one suggested reason for this poor structure control of (polyBA)$_n$-polyEGDA star polymers could be attributed to the fast reaction of EGDA, which generated broadly distributed nanogels and led to the multimodal distribution of the star product. This phenomenon can be overcome by using a free radical initiator that decomposes at a slower rate or by running the reaction at a lower temperature.

There are no "standard" reaction conditions and one skilled in the art should select reaction conditions to attain the desired star structure from a solution of the targeted MM's, crosslinking agent and FRP initiator in either bulk or a dispersed medium based on the methods described herein.

This can be exemplified by use of different molar ratios of DVB as a comonomer during the FRP with polyBA MM. Comparing the homopolymerization of polyBA MM (entry S-BD0, Table 1) and the copolymerization of polyBA MM with 6 eq. of St (entry S-BS6, Table 1), the FRP reaction using 3 eq. of DVB as comonomer produced a star product with the highest MM conversion and the highest star molecular weight (FIG. 4).

These results indicate the DVB acted not only as a comonomer, which was incorporated into the backbone of the MM and decreased the high steric congestion during the homopolymerization of bulky polyBA MM, but also acted as a cross-linker by generating pendant vinyl groups in the backbone of the first formed copolymer, which allowed cross-linking of the functional copolymers together and allowed more arms to be incorporated into the formation of the core of one branched star molecule. Besides, the rigid structure and incompatibility of polyDVB core with the first MM arms also helps to protect the radicals in the core from diffusing and coupling with other radicals, which decreased star-star coupling and produced well-defined structures.

TABLE 1

Synthesis of (polyBA)$_n$-polyX star polymers from MM[1]

| Entry[2] | MM | X | $A_{star}$[4] | $M_{w,RI}$[5] (kg/mol) | $M_{w,MALLS}$[6] (kg/mol) | $M_w/M_n$[5] (star) |
|---|---|---|---|---|---|---|
| S-BD0 | PolyBA$_{42}$ | / | 0.71 | 26.3 | 26.4 | 1.18 |
| S-BS6[3] | PolyBA$_{42}$ | St | 0.74 | 58.2 | 75.8 | 1.42 |
| S-BD3 | PolyBA$_{42}$ | DVB | 0.79 | 90.9 | 392.5 | 1.30 |
| S-BE3 | PolyBA$_{42}$ | EGDA | 0.77 | 403.0 | / | 7.43 |
| S-ED3 | PEO$_{45}$ | DVB | 0.95 | 144.0 | / | 1.97 |

[1]Experimental conditions: [MM]$_0$/[X]$_0$/[AIBN]$_0$ = 1.0/3.0/0.2, in anisole at 80° C.; [MM]$_0$ = 0.06M, linear polyMMA standards for DMF GPC calibration for S-ED1 and linear polySt standards for THF GPC calibration for the others.
[2]In S-αβγ", "S" represents star, "α" and "β" respresent the corresponding linear MM and cross-linker; γ = [X]$_0$/[MM]$_0$. For α, letters B and E represent polyBA MM and PEO MM, respectively. For β, letters S, D, E represent St, DVB and EGDA, respectively.
[3]6 eq. of St was used as comparable amount to 3 eq. of DVB.
[4]Area fraction of star polymers, determined by the multi-peak splitting of the GPC curve using Gaussian function.
[5]Weight-average molecular weight and polydispersity, measured by GPC with RI detector, calibration with linear polyMA standard for sample S-ED1 and polySt as standard for the others.
[6]Weight-average molecular weight, measured by THF GPC with MALLS detector.

In addition to the selection of an appropriate crosslinking agent, such as DVB as the comonomer, the selection of a linear MM with an appropriate structure is also a means to obtain a well-defined star polymer during the FRP.

Synthesis of PEO Star Polymers from Macromonomers:

In the following example, the novel MM star forming procedure is extended to copolymerization of a polyethylene oxide (PEO) MM allowing the formation of water-soluble star polymers. Functional groups can also be introduced into the star core by using functional initiators or functional low molecular weight monomers.

In order to exemplify the preparation of water soluble star macromolecules using this new procedure a PEO methacrylate monoether macromonomer with average molecular weight 1100 was copolymerized with an exemplary divinyl crosslinking agent. The MM was selected for this initial run not only because of its higher molecular weight when compared to other commercially available PEO MM's, but also because of its high purity when compared to commercially available HO-PEO MM's.

When a PEO MM with DP=45 ($PEO_{45}$) was used as the arm precursor for FRP with DVB to synthesize $(PEO)_n$-polyDVB star polymers the GPC curves shown in FIG. 5 indicate that star polymers were formed in high star yield ($A_{star}$=95%), the star polymers showed a broader distribution ($M_w/M_n$=1.97, S-ED3 in Table 1) than the $(polyBA)_n$-polyDVB star polymers (entry S-BD1, Table 2) but were still symmetrical indicating uniform star structures. The high star yield and broader distribution of the $(PEO)_n$-polyDVB star polymers were ascribed to the "thinner" structures of the PEO MM, which allowed a fast incorporation of more arms into one star molecule, but with less steric protection around the core to minimize the star-star coupling reactions.

This instantaneous limitation can be overcome by conducting the copolymerization with lower concentrations of the radical initiator or running the reaction at a lower temperature.

$(PolyBA)_n$-$(PEO)_p$-polyDVB:

Mikto-arm star polymers were prepared by cross-linking mixtures of polyBA MM ($M_n$=5300) and PEO MM (Mn=1100). The results indicate that the conversions of both PEO MM and polyBA MM increased with the reaction time, evidenced by the decreased RI intensity of the two MMs. The star final yield reached 86% and the PDI of the miktoarm star copolymer was 1.40.

Effect of Reaction Conditions on the Structure of the Formed Star Molecule:

Based on the criteria established for selection of linear MM and cross-linker, a $polyBA_{42}$ mM and DVB cross-linker were selected as an optimal combination that was used in a series of FRP to synthesize $(polyBA)_n$-polyDVB star polymers that measured the effect of reaction conditions on the structure of the resulting well defined star macromolecule.

Several experimental parameters were examined, including the amount of cross-linker, the amount of AIBN initiator, the reaction temperature and the sequential addition of several batches of cross-linker, initiator and macromonomer. Their effects on the star structures, such as star molecular weight, star yield and star polydispersity are discussed below to provide information on the affect of reaction conditions on star macromolecule topology and functionality.

Effect of DVB Amount on the Star Structure:

During the synthesis of $(polyBA)_n$-polyDVB star polymers by FRP of polyBA MM and DVB, the role of DVB is two fold. The incorporation of the crosslinker into the initially linear MM polymer chains not only decreased the congestion of the polymer backbone compared to homopolymerization of polyBA MM, but also introduced pendant vinyl groups into the polymers and allowed different branched chains to be connected together. Therefore, the amount of added DVB cross-linker is expected to have a significant effect on the structures of the final star polymers.

FIG. 6A shows the GPC traces of five types of star polymers synthesized using different amounts of DVB ($X=[DVB]_0/[polyBA_{42}]_n$=0 to 7. By systematically changing the initial molar ratio of cross-linker to MM, the results indicate that higher amounts of DVB leads to the formation of $(polyBA)_n$-polyDVB star polymers in higher star yield, with higher star molecular weight, broader molecular weight distribution, and more polyBA arms per star molecule (Table 2).

TABLE 2

Synthesis of $(polyBA)_n$-polyDVB star polymers by varying DVB amounts[1]

| Entry[2] | $[DVB]_0/[polyBA_{42}]_0$ | $A_{star}$[3] | $M_{w,RI}$[4] (kg/mol) | $M_{w,MALLS}$[5] (kg/mol) | $M_w/M_n$[4] (star) | $N_{arm}$[6] |
|---|---|---|---|---|---|---|
| S-BD0 | 0 | 0.71 | 26.3 | 26.4 | 1.18 | 4.7 |
| S-BD1 | 1 | 0.71 | 50.1 | 95.2 | 1.25 | 16.5 |
| S-BD3 | 3 | 0.79 | 90.9 | 392.5 | 1.30 | 64.1 |
| S-BD5 | 5 | 0.85 | 138.0 | 791.5 | 1.44 | 123.6 |
| S-BD7 | 7 | 0.85 | 289.0 | 2184 | 1.95 | 323.4 |

[1]Experimental conditions: $[polyBA_{42}]_0/[DVB]_0/[AIBN]_0$ = 1.0/X/0.2, in anisole at 80° C.; $[polyBA_{42}]_0$ = 0.06M, linear polySt standards for THF GPC calibration.
[2]In S-BDγ, "S" represents star, B and D respresent the corresponding $polyBA_{42}$ MM and DVB cross-linker; γ = $[DVB]_0/[polyBA_{42}]_0$.
[3]Area fraction of star polymers, determined by the multi-peak splitting of the GPC curve using Gaussian function.
[4]Weight-average molecular weight and polydispersity, measured by THF GPC with RI detector, calibration with linear polySt as standard.
[5]Weight-average molecular weight, measured by THF GPC with MALLS detector.
[6]Number-average value of the number of arms per star molecule $N_{arm}$ = $Arm_{wt}$% × $M_{w,MALLS}/M_{n,theor,MM}$, where $Arm_{wt}$% is the weight fraction of polyBA arm in the star polymer.

When X=5 (S-BD5, Table 2), the star yield reached $A_{star}$=85% and the average arm number per star was $N_{arm}$=123.6, FIG. 6B. Further increases in the amount DVB added to the reaction did not change the star yield but increased the star molecular weight ($M_{w,MALLS}$=2184 kg/mol) and correspondingly the average number of arms, $N_{arm}$=323.4, in the final star (S-BD7, Table 2).

Effect of the Amount of Added Initiator (AIBN) on the Structure of the Final Star Macromolecule:

The ratio of $[AIBN]_0/[MM]_0$ was considered as another factor that would affect the structure of the star. When the initial molar ratio of $[DVB]_0/[polyBA_{42}]_0$ was held constant at 3:1, addition of more AIBN initially resulted in a higher instantaneous radical concentration at any time, which resulted in a faster copolymerization of the MM and DVB and faster generation of star polymer precursors. Therefore, addition of more AIBN leads to a higher star yield. For instance, when the molar ratio of $[AIBN]_0/[MM]_0$ was 0.60, the star yield was $A_{star}$=0.87, which is higher than the 70% star yield when the 0.07 eq. of AIBN was used.

On the other hand, addition of more AIBN into the reaction system decreases ratio of MM to formed radicals; consequently increasing the amount AIBN generates more star polymers and decreases the size of the stars. As a result, when more AIBN was used the $(polyBA)_n$-polyDVB star polymers had a lower molecular weight and lower number of arms per star molecule, compare S-BD3 and S-BD3-3 in Table 3.

TABLE 3

Summary of synthesis of (polyBA)$_n$-polyDVB star polymers from MM by FRP[1]

| Entry[2] | [AIBN]$_0$/[MM]$_0$ | Temp (° C.) | A$_{star}$[3] | M$_{w,RI}$[4] (kg/mol) | M$_{w,MALLS}$[5] (kg/mol) | M$_w$/M$_n$[4] (star) | N$_{arm}$[6] |
|---|---|---|---|---|---|---|---|
| S-BD3-1 | 0.20 | 65 | 0.75 | 112.9 | 520.5 | 1.38 | 84.6 |
| S-BD3-2 | 0.07 | 80 | 0.70 | 107.8 | 515.6 | 1.34 | 83.1 |
| S-BD3 | 0.20 | 80 | 0.79 | 90.9 | 392.5 | 1.30 | 64.1 |
| S-BD3-3 | 0.60 | 80 | 0.87 | 80.6 | 256.6 | 1.29 | 42.3 |
| S-BD3-4 | 0.20 | 95 | 0.80 | 85.0 | 327.4 | 1.22 | 53.6 |

[1]Experimental conditions: [polyBA$_{42}$]$_0$/[DVB]$_0$/[AIBN]$_0$ = 1.0/3.0/I, in anisole; [polyBA$_{42}$]$_0$ = 0.06M, linear polySt standards for THF GPC calibration.
[2]In S-BD3-δ", "δ" is sequentially numbered to represent experiments with different AIBN amount or reaction temperature as compared to the reaction S-BD3.
[3]Area fraction of star polymers, determined by the multi-peak splitting of the GPC curve using Gaussian function.
[4]Weight-average molecular weight and polydispersity, measured by THF GPC with RI detector, calibration with linear polySt as standard.
[5]Weight-average molecular weight, measured by THF GPC with MALLS detector.
[6]Number-average value of the number of arms per star molecule N$_{arm}$ = Arm$_{wt}$% × M$_{w,MALLS}$/M$_{n,theor,MM}$, where Arm$_{wt}$% is the weight fraction of polyBA arm in the star polymer.

Effect of Reaction Temperature on the Structure of the Star Copolymer:

Changing in the reaction temperature has a similar effect on the star structures, as varying the initial amount of AIBN added to the reaction. At lower temperatures, the decomposition rate of AIBN is slower, which results in the generation of fewer radicals, and produces star polymer precursors more slowly which results in the formation of stars with higher molecular weight. Therefore, the general effect of decreasing temperature is similar to that observed when using less AIBN. Conversely when higher reaction temperatures are used, the rate of decomposition of AIBN increases, generating more radicals at the beginning of the reaction producing more star polymer precursors, quicker star formation, and consequently stars with lower molecular weight; compare runs S-BD3-1, S-BD3 and S-BD3-4. However, since the initial amount of AIBN added was the same, faster decomposition means quicker disappearance of AIBN from the system and the star yield using higher reaction temperatures (e.g., 95° C.) is only marginally higher than the model reaction performed at 80° C.; FIG. 7.

Addition Features that Affect of the Structure of the Star Copolymer:

An important criterion for industrial scale, or economic, success during the synthesis of structure-controlled star polymers using the FRP of a linear MM and a crosslinking agent, exemplified herein by (polyBA)$_n$-polyDVB, is to obtain the target star nano-structured macromolecule in high yield; since low star yield increases the complexity of star purification and increases the cost of large-scale application of this method for synthesis of star polymers. Within our initial scoping investigation, the highest star yield was A$_{star}$=85% when 5 eq. of the cross-linker was used. Further increases in the amount of crosslinker initially added to the reaction had little, or no, effect on star yield, but led to a broader star molecular weight distribution. In order to increase the star yield while retaining a fairly low polydispersity of the star polymer (i.e., M$_w$/M$_n$<2.5, preferentially <2.0 and optimally <1.5), a multi-step addition of low molar mass cross-linker and initiator was utilized during the cross-linking reaction.

The results verified this as a promising strategy for synthesis of low polydispersity star and/or mikto-arm star copolymers with quantitative star yield. The addition of more than one batch of DVB and AIBN during the reaction results in incorporation of more pendant vinyl groups into the initial linear/branched MM/DVB copolymer and ultimately more propagating radicals being introduced to the star core, which expands the core size and decreases core congestion. Through the selection of appropriate amounts of DVB and AIBN that were added in each batch, it was possible to increase the star molecular weight and star yield to greater than 90% while retaining the fairly reasonable molecular weight distribution for the final star polymer. The results shown in FIG. 8 indicate that star molecular weight, star yield and star molecular weight distributions increased when additional aliquots of DVB and/or AIBN were added during the reaction. A mixture of 1 eq. of DVB and 0.05 eq. of AIBN was added to a reaction starting with an initial mole ratio of reagents [polyBA$_{42}$]$_0$/[DVB]$_0$/[AIBN]$_n$=1/3/0.1, every 24 h. FIG. 8 shows that after 70 h, the resulting star polymers were prepared in higher star yield A$_{star}$=91%, with lower polydispersity, M$_w$/M$_n$<1.45, compared to star polymers synthesized by initially adding 5 eq. of DVB in one-batch system (A$_{star}$=85%, M$_w$/M$_n$=1.44, S-BD5, Table 2).

The strategy of adding a total of 5 eq. of DVB in 3 batches further increased the star yield, while retaining the same narrow molecular weight distribution. A similar effect would be expected if a small amount of a mono-vinyl monomer was added as this would make the trapped radical more accessible to the macromonomer.

Introduction of Additional Functionality into the Star Core:

Compared to the star synthesis of using a standard ATRP technique, one advantage of a standard FRP is that no deoxygenation process is required and there is no catalyst contamination in the final product. Therefore, the polymerization is easy to set up and the purification costs are minimal. However, the use of a thermal initiator means that it may be difficult to introduce additional functionalization into the core of the resulting star macromolecule. While some functional initiators are commercially available, and desired functionality can be introduced into a custom synthesized free radical initiator if the volume of the product is sufficiently high. While we previously successfully introduced pyrene groups into the star core by using ATRP process, in a FRP process pyrene groups can most easily be encapsulated into the star core by physical embedment as an alternative to introducing pyrene functional group into AIBN or other free radical initiator derivatives.

One experiment was performed by using FRP to synthesize (polyBA)$_n$-polyDVB(pyrene) star polymers in the presence of a desired functional molecule. In this exemplary example 0.3 eq. of 1-pyrenebutanol (Py-BuOH) was dissolved in the anisole solution before conducting the FRP copolymerization. PolyBA star polymers were synthesized by AIBN copolymerization of MM and DVB, FIG. 9. Under these conditions, a small amount of Py-BuOH would be physically encapsulated inside the star cores. After polymerization, the star polymers were purified by subjecting the product to dissolution/precipitation two times to remove the linear chain MM chain and any free, or extractable Py-BuOH before UV measurement. A positive UV signal measured in the final purified star macromolecule can be attributed to encapsulated pyrene molecules within the star core. FIG. 9 shows the UV-vis spectrum of the $(polyBA)_n$-polyDVB(pyrene) star polymers, which shows the characteristic peaks of pyrene between 300 and 360 nm The polymer concentration in the measured star sample was $3.15 \times 10^{-4}$ g/g in THF. Based on calibration of a standard solution of Py-BuOH in THF the Py-BuOH content in the final solution of star molecules was $4.83 \times 10^{-7}$ g/g in THF. So the percentage of pyrene incorporated into the core of the star polymer is 0.15 wt %, taking into account the experimental formula, the total weight of star polymer was 2.14 g, so the total encapsulated pyrene is 3.3 mg. The total added 1-pyrene butanol was 29.4 mg. If the calibration of pyrene-Br is taken to be similar to that of 1-pyrene butanol, the percentage of pyrene encapsulation is 11.2 wt %. The formation of a water soluble pyrene-containing PEO star polymer could be envisioned as a model for drug-carrying star copolymers.

The $(polyBA)_n$-polyDVB star polymers synthesized by FRP of polyBA MM and DVB were also compared to those produced by using ATRP technique. The results in FIG. 2A indicate that for the specific DVB cross-linker, the stars by FRP method have a comparable quality to stars prepared by ATRP, although the FRP method had advantages, as described herein, such as an easy set up procedure and lack of metal catalyst. DVB is one of the best cross-linkers for polyBA MM in both FRP and ATRP process. Without intending to be limited by any interpretation, the low $k_p$ of styrene and less flexible structure of DVB may provide desired properties. Reaction conditions and crosslinkers can be selected to mimic the present performance of DVB and incorporate other divinyl agents into the star core using the process described herein.

The invention claimed is:

1. A process for the preparation of star macromolecules comprising:
    copolymerizing one or more macromonomer having a polymerizable vinyl group and a divinyl monomer in a homogeneous reaction medium without formation of micelles in the presence of a standard free radical initiator to provide a star macromolecule having a polydispersity of less than 2.5.

2. The process of claim 1 wherein the star macromolecule has a polydispersity less than 2.0.

3. The process of claim 1 wherein the macromonomer comprises ω-functionality.

4. The process of claim 1 wherein the macromonomer comprises α-functionality in addition to the polymerizable vinyl group.

5. The process of claim 1 further comprising controlling the molecular structure of the star macromolecule by selecting a molar ratio of macromonomer to the divinyl monomer to the free radical initiator.

6. The process of claim 1 wherein the divinyl monomer is added to the reaction medium periodically.

7. The process of claim 1 wherein the free radical initiator is added to the reaction medium periodically.

8. The process of claim 1 wherein more than one type of free radical initiator is added to the reaction medium.

9. The process of claim 8 wherein the more than one type of free radical initiator is added to the reaction at different times.

10. The process of claim 1 wherein the molar ratio of divinyl monomer to free radical initiator controls the size of the formed core.

11. The process of claim 1 wherein the free radical initiator comprises an additional functional group and the additional functional group is incorporated into the core of the star macromolecule.

12. The process of claim 11, further comprising controlling one of star size and star core functionality by varying the selecting a molar ratio of divinyl monomer to free radical initiator.

13. The process of claim 1 further comprising adding a low molecular weight mono-vinyl monomer to the copolymerizing step, wherein the low molecular weight mono-vinyl monomer modifies the core of the star.

14. The process of claim 13 wherein the low molecular weight mono-vinyl monomer comprises an additional functional group.

15. The process of claim 1 further comprising adding a low molecular weight functional molecule to the copolymerizing step and encapsulating the low molecular weight functional molecule within a core of the star macromolecule.

16. The process of claim 1 wherein the copolymerizing step is conducted in one phase of a bi-phasic reaction medium.

17. The process of claim 1 wherein the star macromolecule comprises arms that predominately comprise the added macromonomer.

18. The process of claim 1 wherein two or more different macromonomers are added to the copolymerization and one or more of the arms of the star macromolecule comprise a different composition than one or more other arms.

19. The process of claim 18 wherein the two or more different macromonomers comprise different ω-functionality and one or more of the arms of the star macromolecule comprise different peripheral ω-functional groups.

20. The process of claim 1 wherein the polymerization process is a free radical polymerization process and the resulting star macromolecule has a PDI of less than 1.5.

21. The process of claim 1 wherein the concentration of the macromonomer ranges from about 0.0001 M to about 0.5 M.

22. The process of claim 1 wherein more than 10 macromonomer units are incorporated into the star macromolecule.

23. The process of claim 1 further comprising controlling the molecular structure of the star macromolecule by selecting a steric bulk of the monomer units close to the α-chain end of the macromonomer.

24. The process of claim 23 wherein the macromonomer is a gradient copolymer or a block copolymer.

25. The process of claim 24 wherein the macromonomer comprises a gradient copolymer or block copolymer with a short block of desired bulkiness to provide the desired reactivity in a core formation reaction or a core growth reaction.

26. A process for the synthesis of multi-arm star polymers with a molecular weight of at least 50 kg/mol and narrow molecular weight distribution and pre-selected site specific functionality comprising:
    copolymerizing macromonomers having a vinyl group and functionality located on a backbone of the macromonomer with a divinyl monomer by a standard free radical polymerization process in a homogeneous reaction medium without formation of micelles to form the multi-arm star polymer having a polydispersity of less than 2.5.

27. The process of claim 26, wherein the free radical polymerization process is initiated by a free radical initiator.

28. The process of claim 27, wherein the free radical initiator comprises a second functional group.

29. The process of claim 26, wherein the free radical polymerization process is initiated by a process selected from the group consisting of initiation by a photoinitiator, initiation by irradiation, a controlled radical polymerization process, initiation by heating, and initiation by a peroxygen compound.

30. The process of claim 26, wherein the macromonomers comprise two or more different macromonomers with different functional groups on the ω-termini of a linear polymer chain.

31. The process of claim 26, wherein the macromonomers comprise two or more different macromolecules.

32. The process of claim 1, wherein more than 100 macromonomers units are incorporated into the star macromolecule.

33. A process for the preparation of star macromolecules comprising:
copolymerizing one or more macromonomer having a polymerizable vinyl group and a divinyl monomer in a homogeneous reaction medium in the presence of a standard free radical initiator to provide a star macromolecule having a polydispersity of less than 2.5;
wherein two or more different macromonomers are added to the copolymerization and one or more of the arms of the star macromolecule comprise a different composition than one or more other arms; and
wherein a first macromonomer is initially present in the copolymerizing step and a second macromonomer is added to the copolymerization after more than 50% of the initially added free radical initiator has decomposed.

34. The process of claim 33, wherein the second macromonomer is added to the copolymerization after more than 75% of the initially added free radical initiator has decomposed.

35. The process of claim 33, wherein the second macromonomer is added to the copolymerization after a core of the star has formed and after a majority of the free radical initiator has decomposed.

* * * * *